US007100050B1

(12) United States Patent
Coppersmith et al.

(10) Patent No.: US 7,100,050 B1
(45) Date of Patent: Aug. 29, 2006

(54) SECURED SIGNAL MODIFICATION AND VERIFICATION WITH PRIVACY CONTROL

(75) Inventors: Don Coppersmith, Ossining, NY (US);
Frederick C. Mintzer, Shrub Oak, NY (US); Charles P. Tresser, Mamaroneck, NY (US); Samuel M. Weber, New York, NY (US); Chai Wah Wu, Poughquag, NY (US); Minerva Ming-Yee Yeung, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,359

(22) Filed: May 15, 2000

Related U.S. Application Data

(63) Continuation-in-part of application No. 09/059,498, filed on Apr. 13, 1998, and a continuation-in-part of application No. 09/282,861, filed on Mar. 31, 1999.

(51) Int. Cl.
*H04L 9/00* (2006.01)
*H04N 7/16* (2006.01)

(52) U.S. Cl. ..................................... 713/176; 380/201
(58) Field of Classification Search ................ 713/176; 380/201
See application file for complete search history.

(56) References Cited

U.S. PATENT DOCUMENTS

| 4,972,475 | A | * | 11/1990 | Sant'Anselmo | ............... | 380/54 |
| 5,530,759 | A | * | 6/1996 | Braudaway et al. | ........... | 380/54 |
| 5,619,633 | A | | 4/1997 | Turner | ......................... | 345/441 |
| 5,636,292 | A | * | 6/1997 | Rhoads | ........................ | 382/232 |
| 5,646,997 | A | * | 7/1997 | Barton | ........................ | 713/176 |
| 5,721,788 | A | * | 2/1998 | Powell et al. | ................ | 382/100 |
| 5,764,770 | A | * | 6/1998 | Schipper et al. | ............. | 713/176 |
| 5,850,346 | A | * | 12/1998 | Barrus | .......................... | 708/495 |
| 5,875,249 | A | * | 2/1999 | Mintzer et al. | ................ | 380/54 |
| 5,898,779 | A | * | 4/1999 | Squilla et al. | ............... | 713/176 |
| 5,930,369 | A | * | 7/1999 | Cox et al. | ....................... | 380/54 |
| 5,969,699 | A | | 10/1999 | Balram et al. | ................. | 345/10 |
| 6,061,793 | A | * | 5/2000 | Tewfik et al. | ................ | 713/176 |
| 6,088,123 | A | * | 7/2000 | Adler et al. | ................ | 358/3.28 |
| 6,233,684 | B1 | * | 5/2001 | Stefik et al. | ................. | 713/176 |
| 6,959,220 | B1 | * | 10/2005 | Wiser et al. | .................... | 700/94 |

OTHER PUBLICATIONS

R. Ohbuchi et al., "A Robust Data Hiding Technique Using Multidimensional Lattice", IEEE, pp. 22-24, Apr. 1998.

(Continued)

*Primary Examiner*—Emmanuel L. Moise
*Assistant Examiner*—Michael Pyzocha
(74) *Attorney, Agent, or Firm*—Jesse L. Abzug, Esq.; McGinn IP Law Group, PLLC

(57) ABSTRACT

A watermarking scheme is provided that allows the watermarked image to be authenticated by an authentication agent without revealing the human-readable content of the image. There is disclosed an approach that combines privacy control with watermarking and authentication mechanisms. The watermark can be made to be imperceptible to humans. Public key cryptography allows the authentication agent to authenticate without being able to watermark an image. Watermark information may also be encoded in a vector graphics image that includes at least one stroke defined by coordinate values of an ordered sequence of points. This may be obtained by providing watermark information as a bit sequence, identifying one or more redundant properties of the image, modifying the redundant properties based upon the bit sequence to generate a representation of the image and storing the representation of the image for subsequent use.

4 Claims, 17 Drawing Sheets

OTHER PUBLICATIONS

Minerva et al., "Fragile Watermarking of Three-Dimensional Objects", IEEE, pp. 442-447, Oct. 1998/.

R. Ohbuchi et al., "Watermarking Three-Dimensional Polygonal Models", IEEE, pp. 261-272, Nov. 1997.

M.J.J.J.B., Maes et al., "Digital Watermarking by Geometric Warping", IEEE, pp. 424-426, Oct. 1998.

J.J. Chae, D. Mukherjee et al., Color Image Embedding using Multidimensional Lattice Structures, IEEE, pp. 460-464, Oct. 1998.

R. Ohbuchi et al., "Watermarking Three-Dimensional Polygonal Models Through Geometric and Topological Modifications", IEEE, pp. 551-560, May 1998.

R. Ohbuchi et al., "Data Embedding Algorithm for Geometrical and Non-Geometrical Targets in Three-Dimensional Polygonal Models", Computer Communications, vol. 21, pp. 1344-1354, Oct. 1998.

* cited by examiner

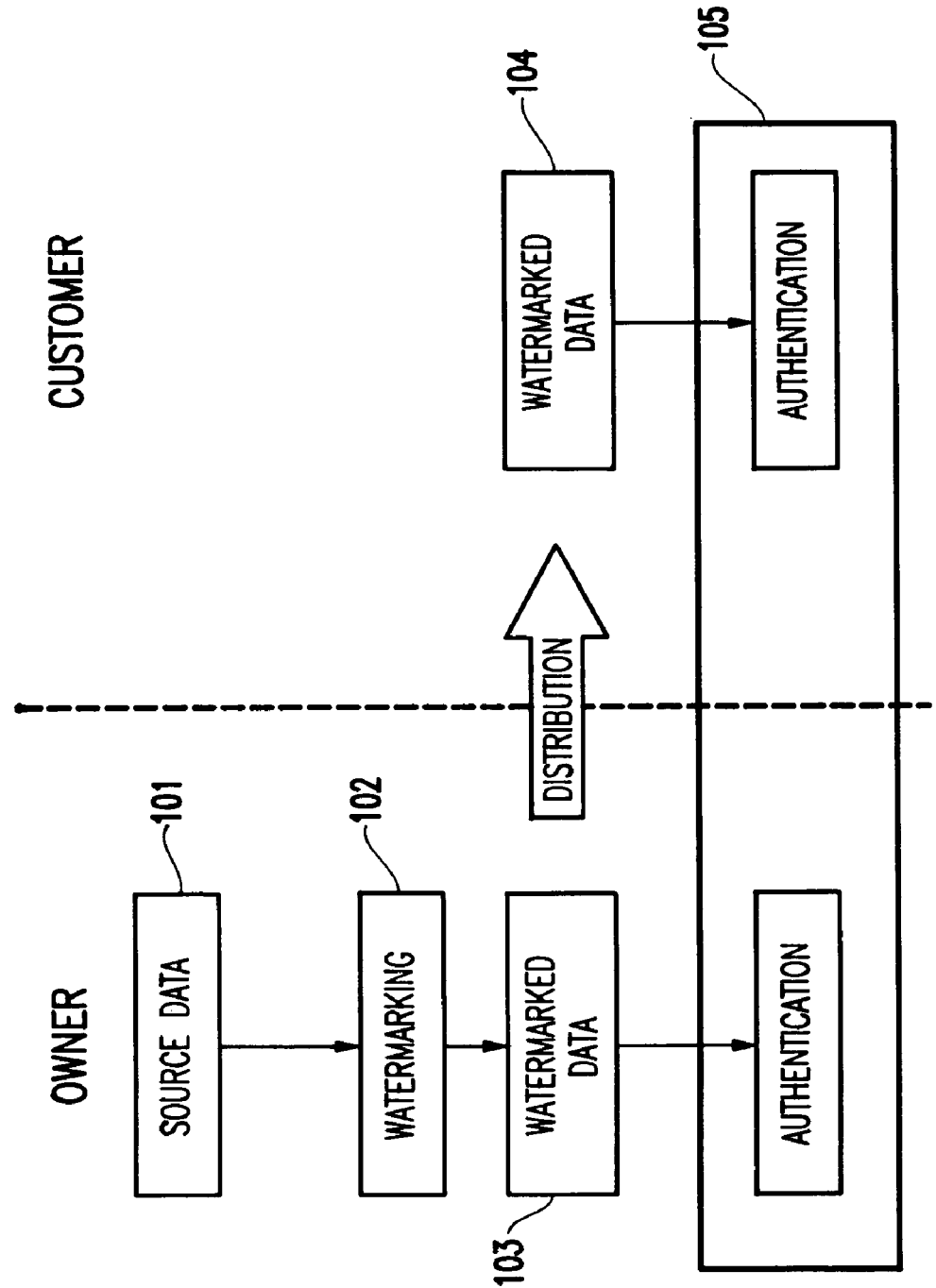

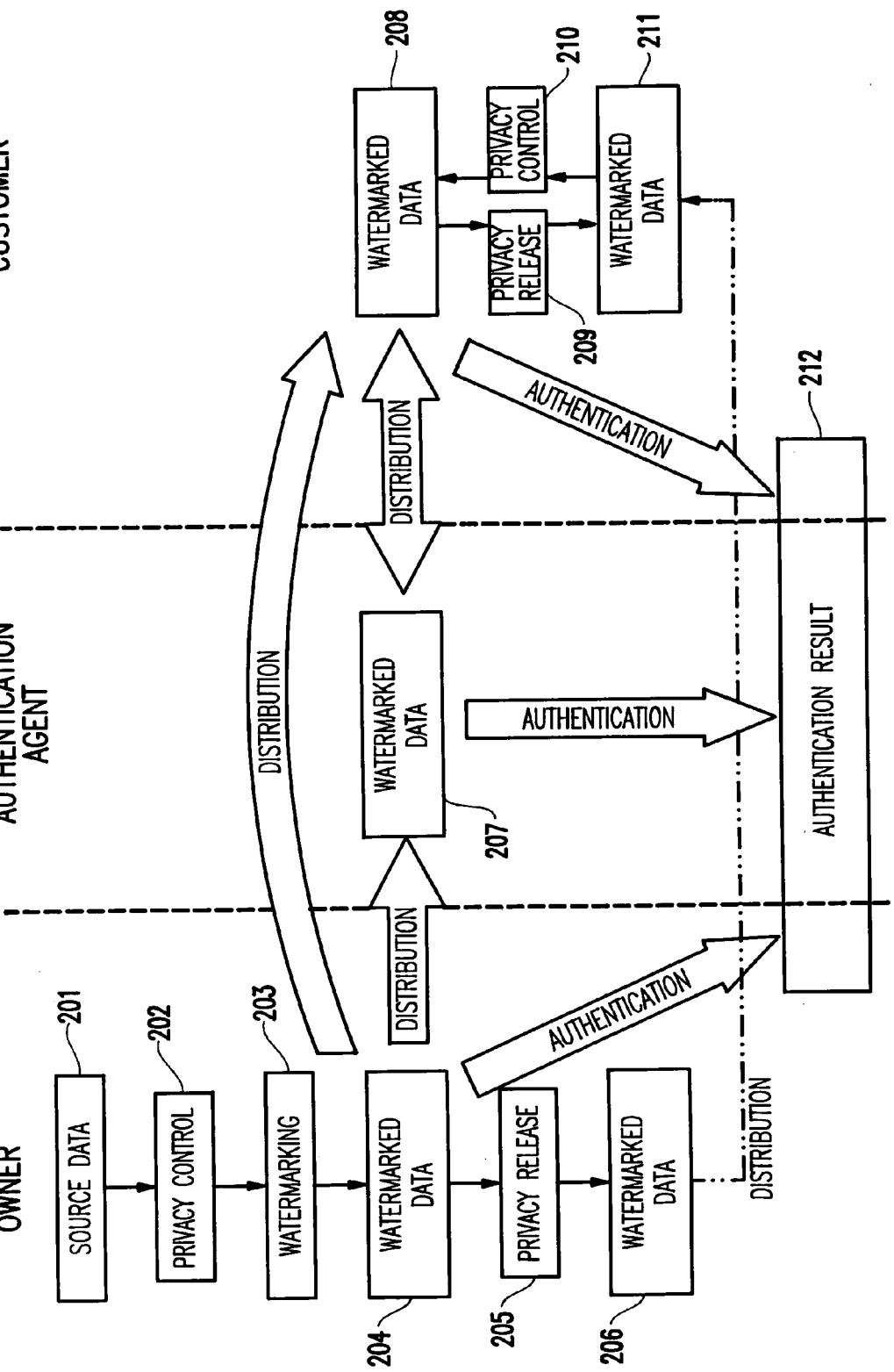

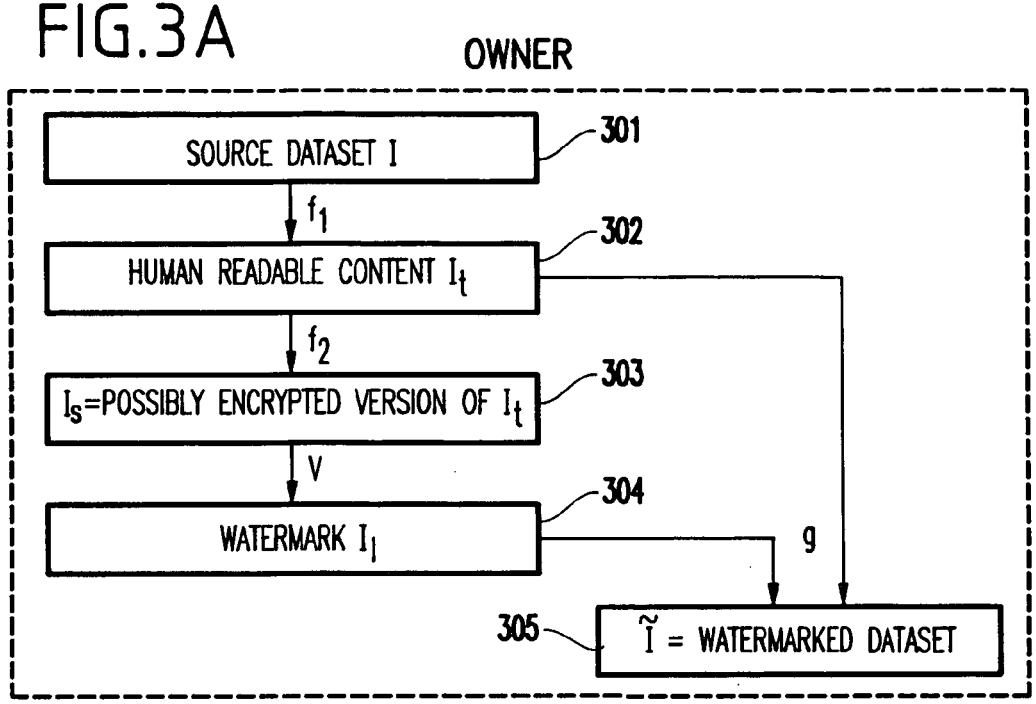
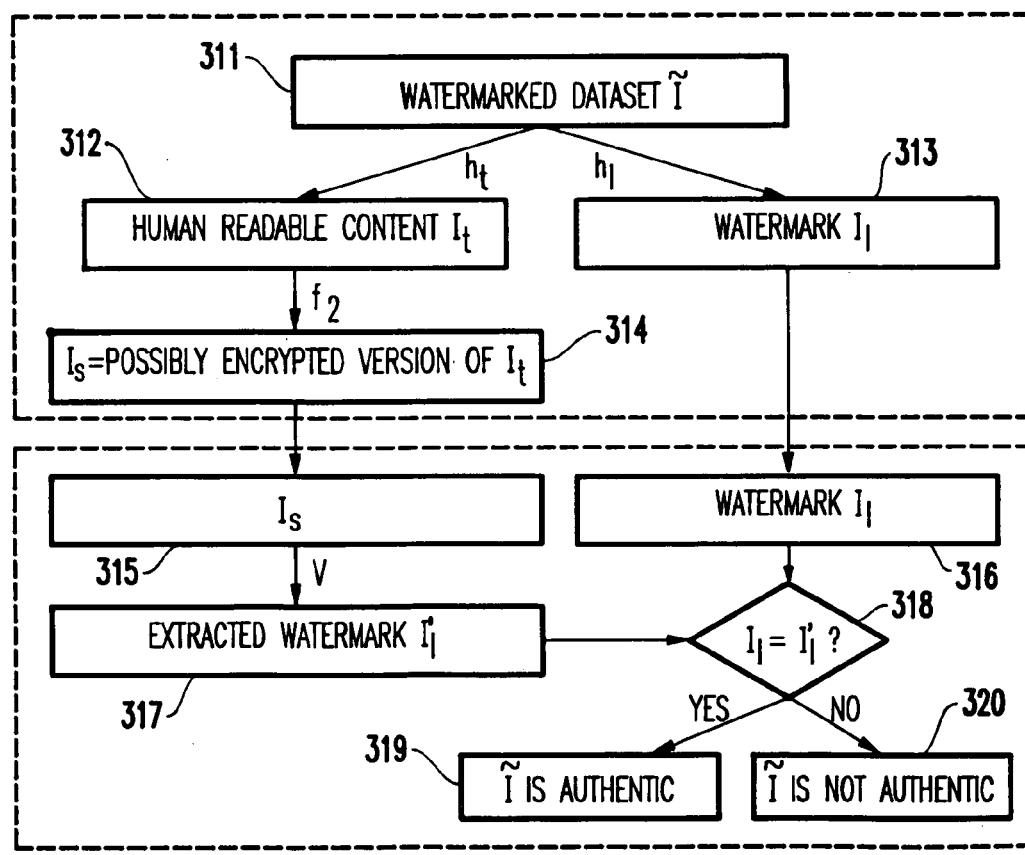

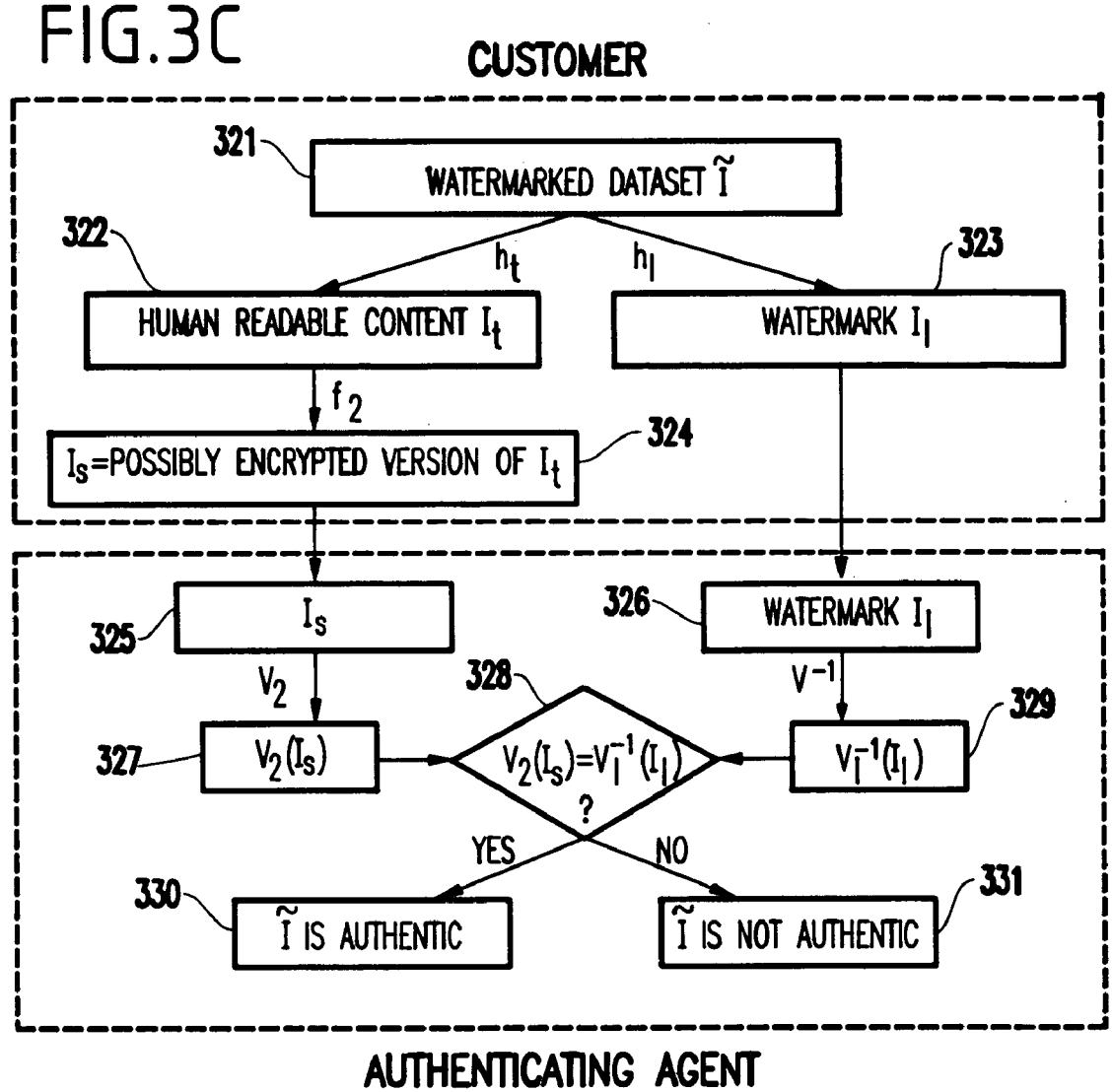

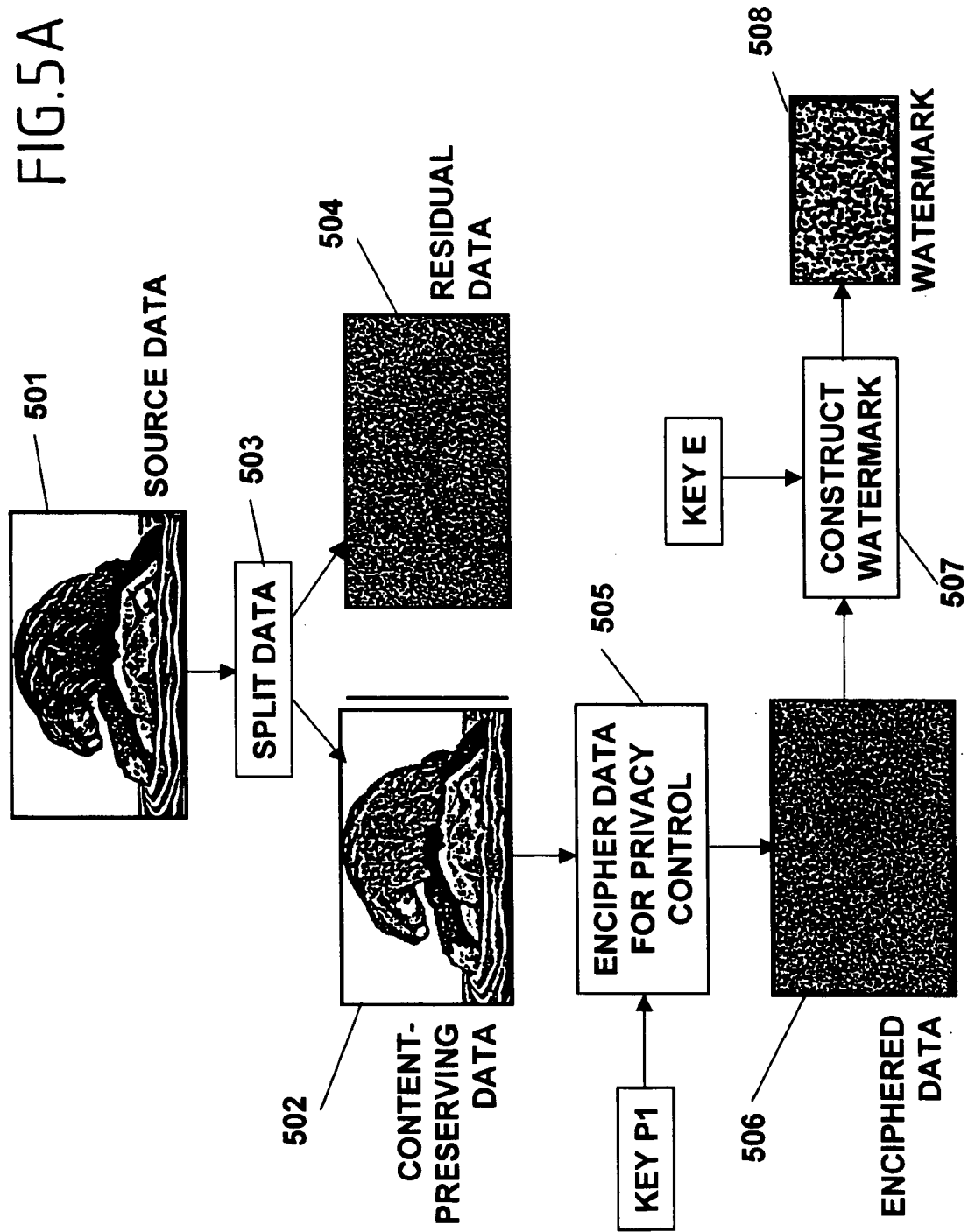

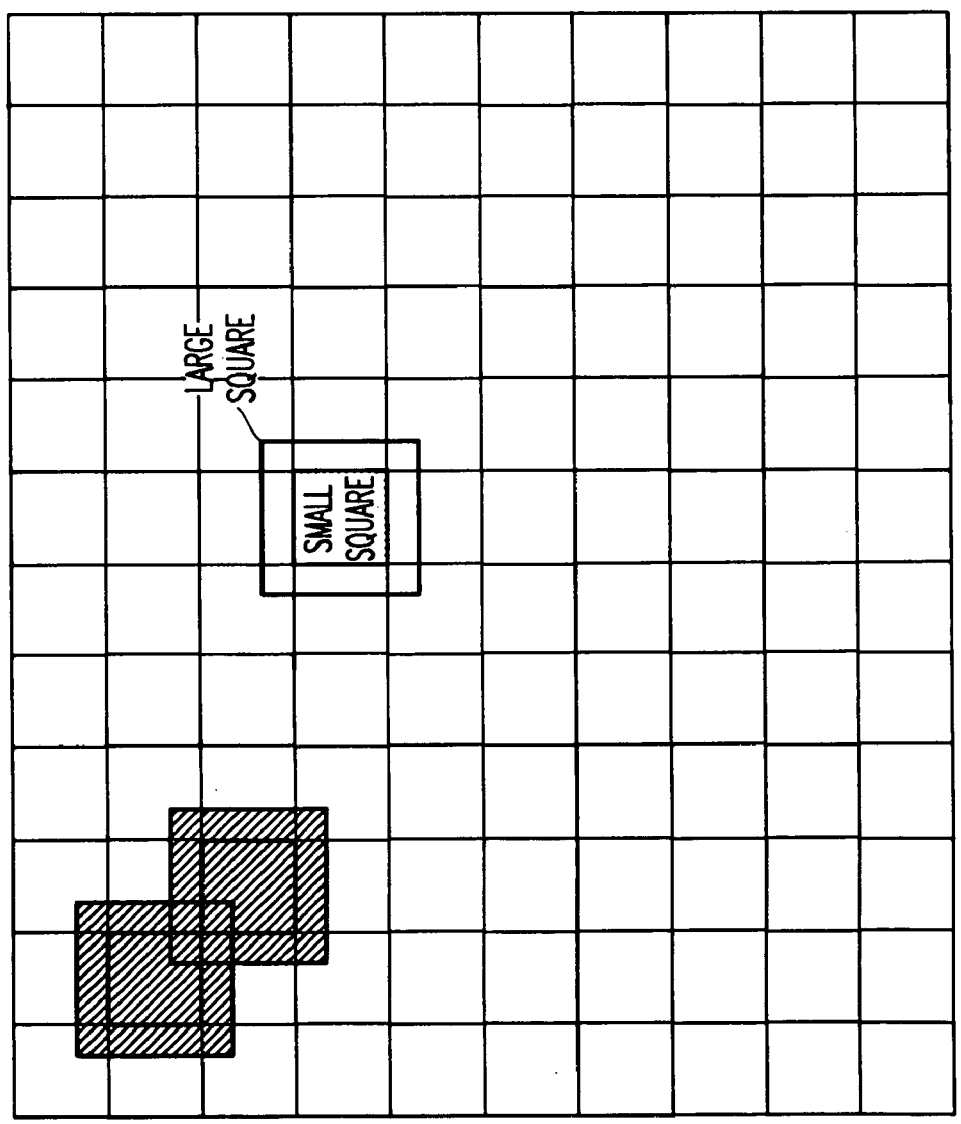

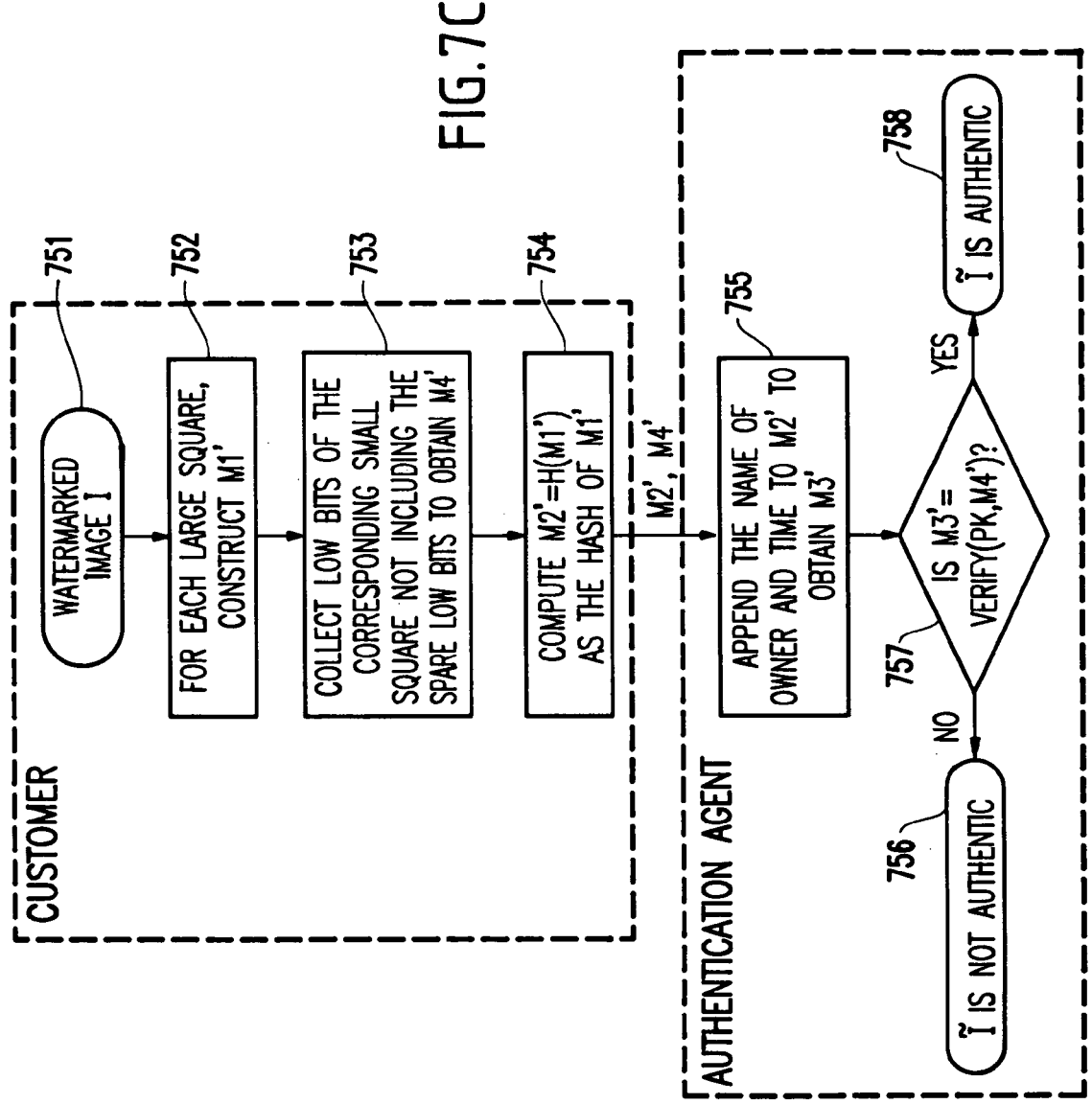

P₁ = (22, 20)

P₂ = (2, 20)

P₃ = (15, 35)

P₄ = (15, 4)

P₁ = (20, 20)

P₂ = (0, 20)

P₃ = (12, 32)

P₄ = (12, 4)

P₁ = (21, 23)

P₂ = (3, 22)

P₃ = (14, 35)

P₄ = (13, 4)

$P_1 = (20, 20)$ $P_2 = (0, 20)$ $P_3 = (13, 35)$ $P_4 = (13, 4)$ $P_1 = (21, 23)$ $P_2 = (1, 23)$ $P_3 = (14, 38)$ $P_4 = (14, 7)$

SECURED SIGNAL MODIFICATION AND VERIFICATION WITH PRIVACY CONTROL

BACKGROUND OF THE INVENTION

This application is a continuation-in-part of U.S. patent application Ser. No. 09/059,498, filed on Apr. 13, 1998, the subject matter of which is incorporated herein by reference. This application is also a continuation-in-part of U.S. patent application Ser. No. 09/282,861, filed on Mar. 31, 1999, the subject matter of which is incorporated herein by reference.

FIELD OF THE INVENTION

The present invention generally relates to imperceptible watermarking of human-perceptible data sets such as sound tracks, images, or videos, where such data sets have been digitized.

DESCRIPTION OF THE RELATED ART

An imperceptible watermark (hereafter "watermark" for short) is an alteration of the data set that is mostly not perceptible to a human, but can be recognized by a machine such as a computer. For instance, if the data set represents an image, the watermark should be (mostly) invisible; if the data set represents a sound track, the watermark should be (mostly) inaudible; and so on. The general principle of such watermarking has been disclosed in prior art.

Some watermarking schemes have been proposed to protect ownership, i.e., establish who is the rightful owner in situations when the ownership is contested. Watermarking techniques have also been used to check the authenticity of a document by identifying the owner and/or the date of creation of a document. Alterations of the image should be detectable by an authentication algorithm, preferably in such a way that the location of the alterations can be located on the image. Authentication should still be possible on a portion of the image. Such watermarks are called fragile watermarks; they are modified (and the modification is detectable) by any modification of the image.

See, for example, "An Invisible Watermarking Technique for Image Verification", M. M. Yeung and F. C. Mintzer, *Proceedings*, International Conference on Image Processing 1997, vol. II pp. 680–683, the subject matter of which is incorporated herein by reference. This paper describes watermarking schemes where the owner of a data set incorporates an imperceptible watermark into the data set. As shown in FIG. 1, the OWNER applies a watermarking scheme 102 to a source data set 101 to obtain the watermarked data set 103. The watermarked data set 103 is distributed to the CUSTOMER 104. Both the OWNER and the CUSTOMER can authenticate 105 the data set by means of the watermark.

A related publication is "The Trustworthy Digital Camera: Restoring Credibility to the Photographic Image", G. L. Friedman, *IEEE Trans. on Consumer Elec.*, vol. 39, no. 4, 1993, pp. 905–910, and U.S. Pat. No. 5,499,294 by G. L. Friedman, the subject matters of which are incorporated herein by reference, and that describe a digital camera that uses cryptography to create a signature for authenticating the images generated. A signature is created for the entire image and appended to the image.

These publications of G. L. Friedman are not watermarks since the signature is appended to the image instead of being embedded in it. This has several drawbacks:

1) To authenticate an image, one needs more than just the image; both the image and the signature are needed.
2) The locations where changes to the image are made cannot be determined.
3) A cropped version of the image cannot be authenticated as the signature depends on the full image.
4) The authentication algorithm needs access to the human-readable part of the image. Therefore, the authentication agent, if different from the CUSTOMER, will also see the human-readable content of the image, a situation that can be undesirable. Drawbacks 1 through 3 may be corrected by using a fragile watermark instead of appending the signature. However, this is at the cost of:
5) Altering the image more severely than just modifying the least significant bits.
6) A signature that does not offer the widely recognized advantages of Secret Key/Public Key (hereafter SK/PK) encryption. One of the advantages is the inability of the authenticating agent to watermark an image when the authenticating agent is not the owner.

Even further, digital information, such as electronic documents, music, videos, etc has undergone a recent proliferation, and is being increasingly used in business. Unfortunately, such information is much easier to alter than the equivalent paper or film equivalents, and once altered it is usually impossible to detect the changes. As a result, methods have been developed to authenticate such information, creating what is commonly called digital signatures.

A digital signature is intended to be the electronic analogue of a physical signature: it provides proof that a certain person saw a given document and that the document wasn't changed afterwards. In a typical use, person A takes a document D and creates a signature $S_{A,D}$ using a digital signature algorithm. An example of such digital signature algorithms can be found in Schneier, B., "Applied Cryptography," Wiley and Sons, 1996, the subject matter of which is incorporated herein by reference. This signature is transmitted along with the document. If someone else receives a document D' and a signature $S'_{A,D}$, they can follow another algorithm that has the following properties:

it will report "genuine" if D'=D and $S'_{A,D}=S_{A,D}$ it is highly likely to report "forged" if the signature does not correspond to the document (i.e., that D' is not the document that was signed), and it is highly likely to report "forged" if the signature was not generated by A. In other words, someone else attempting to falsely claim that A signed a certain document will be almost certainly detected.

There exist digital signature algorithms with even stronger properties than above.

One difficulty with using digital signatures is that two separate pieces of information have to be transmitted. For instance, if the document were an image file, one would have to keep both the original image and the signature. This is not a problem if the applications one uses understand how to properly manipulate signatures, but usually this is not the case: most programs that handle image files do not expect digital signatures.

Watermarking may transform a digital document in such a way as to embed a second piece of data without changing the format or significantly deteriorating the value of the original document. For example, a company might want to distribute a highly valuable document to a very select group of people. If the document is leaked somehow, they want to be able to determine which person was responsible. They could use a watermarking technique to alter each copy that they distribute, embedding the name of the recipient in each version. If a copy is made public, the company can extract from it the name of the original recipient, and pursue legal action against the miscreant.

Watermarking is a useful technique, independent of use with digital signatures. Some proposed uses are the following:

proving copyright infringement—a watermark could encode the owner of a document. If someone else attempted to claim ownership of the document, the existence of the watermark would refute their argument.

tracing unauthorized copies—the recipient of the document could be watermarked into the document itself. If the document was later found in unauthorized hands, the owner could tell which recipient was responsible for such unauthorized distribution of the document.

captioning—many television programs are "subtitled" (a written transcript is carried along with the regular signal to allow deaf or foreign viewers to follow the program). In a similar fashion, electronic documents could be subtitled with useful notes for users.

machine instructions—the illegal copying of videotapes is a problem. One proposed solution to prevent copying of digital media is to watermark instructions as to whether or not the user is allowed to copy the information. Recording devices could read the watermark, and only copy the signals that have a watermark allowing them to.

A challenge for using watermarks to convey digital signatures is that digital signatures, by definition, prevent modification of the information, whereas watermarking involves such a modification.

SUMMARY OF THE INVENTION

In view of the foregoing and other problems of the conventional methods, it is, therefore, an object of the present invention to provide a watermarking as faint, as secure, and as fast as possible with the possibility of tradeoffs between these requirements depending on the intended application.

It is also an object of the invention to provide watermarking using a SK/PK pair.

A further object of the invention is to embed a fragile watermark into an image such that the authentication agent does not need to know the human-readable content of the watermarked image in order to authenticate.

Another object of the invention is to provide the capability to authenticate a watermarked image without being able to watermark an image.

Still another object of the invention is to provide a watermarking scheme in which cropped images can be authenticated and detection of alteration can be localized, yet if pieces of the image are rearranged, the result ceases to be authentic.

Yet another object of the invention is to provide the capability to determine whether an image under consideration is cropped or not.

The present invention may also provide a system that encodes watermark information. This may be accomplished by providing the watermark information as a bit sequence, identifying one or more redundant properties of the image, modifying the redundant properties based upon the bit sequence to generate a representation of the image and storing the representation of the image for subsequent use. In one embodiment, a normal function may be applied to the image and a sign function may be applied to the normalized image. The modifying step may apply a watermarking function to the normalized image with the signature produced by the sign function.

The present invention may also describe a data set distribution scheme where a possibly independent authentication agent can authenticate the data set without being able to read the human-readable data. Furthermore, optionally, the authentication agent A cannot watermark an image using the watermarking scheme of owner O. The general framework is presented in FIG. 2. The owner of the source data 201 transforms it into a watermarked data set 206 by the following steps. First, privacy control 202 is added to the source data. This allows authentication while preserving the privacy of the content of the data set. Next a watermarking algorithm 203 is applied. This results in watermarked data that is privacy-enhanced 204. Because the watermark is image dependent, it may be affecting only the least significant bits of the image. This allows maximal image quality preservation. One cannot extract the human-readable content of the source data from the privacy enhanced watermarked data, but can still authenticate the data 212. This watermarked privacy-enhanced data 204 can be distributed from the owner to the authentication agent or to the customer. Furthermore, it can also be distributed between the authentication agent and the customer.

To recover the watermarked human-readable content, a privacy release algorithm 205 may be applied by the owner or a privacy release algorithm 209 may be applied by the customer. The resulting watermarked data 206 can be distributed from the owner to the customer 211. The customer can then apply privacy control 210 to obtain the watermarked privacy-enhanced data 208. The owner, the authentication agent and the customer could be different parties or the same, depending on the application. This framework is thus much more general than the prior art described in FIG. 1. The generality of this framework is further enhanced because some steps can be easily modified or omitted. For instance, all steps related to privacy protection may be avoided when there is no need for privacy: for instance an image distributor selling images to journals or individuals would not need these steps as opposed to a government agency keeping data on file that may need to have the authenticity of the files controlled while the content of the files remains secret.

As in the prior art (e.g. as disclosed by the Friedman paper), cryptography techniques may be used for authentication. However, in Friedman's disclosure a signature is created for the entire image and the signature is appended to the image. In the present invention, cryptography may be used to create an embedded watermark that can be verified without needing to know the human readable content of the data set. This technique can also serve to prevent the authentication agent from watermarking an image.

The uses of the watermarking techniques of the present invention include authentication of data sets with encoding throughout the data set so that alterations can not only be detected, but also localized. Furthermore, given a cropped image, most of it can be authenticated. Also, the authentication algorithm can detect whether the image to be authenticated has been obtained by cropping a watermarked image.

Notice that the possibility of verifying portions of the data set and localizing the places where changes are made allows preservation of the information content of images that have not been altered intentionally but have been only locally affected by transmission or during storage or retrieval for instance from a magnetic recording device: both communication lines and storing devices usually have some rate of failure. If, as in Friedman's paper, a signature is created that depends on the entire image, changes caused by transmission or storage would result in the image not being authentic—that can be undesirable. In the present invention, if the changes to the image are localized to areas of the human-readable content that is not essential, the image could still be considered authentic in some applications.

There are three main aspects to this embodiment of the present invention. First of all is the ability to allow a watermarked data set to be authenticated without the authentication agent being able to obtain the human-readable content of the data set. This forms the privacy control aspect.

The second aspect is the ability to generate a data set dependent watermark and embed it into the least significant bits of the data set. This implies that the watermark is as faint as possible.

The third aspect is the ability to authenticate cropped versions of the watermarked data set and the ability to detect whether a watermarked dataset has been cropped. It also prevents a "cut and paste" attack on the watermarking scheme, i.e., rearranging portions of the watermarked data set will result in a data set that is not authentic.

Other objects, advantages and salient features of the invention will become apparent from the following detailed description taken in conjunction with the annexed drawings, that disclose preferred embodiments of the invention.

BRIEF DESCRIPTION OF THE DRAWINGS

The invention will be described in detail with reference to the following drawings in which like reference numerals refer to like elements and wherein:

FIG. 1 describes the watermarking and authentication scheme in the prior art;

FIG. 2 describes the proposed watermarking and authentication scheme with privacy control according to the present invention;

FIG. 3a describes the steps the owner undertakes in an embodiment of the present invention to watermark a data set;

FIG. 3b describes the steps the authentication agent and the owner undertake to authenticate a watermarked data set;

FIG. 3c is the same as FIG. 3b, except that public key cryptography is used to prevent the authentication agent from watermarking a data set using the owner's watermark;

FIG. 6a illustrates the large and small squares used in an embodiment of watermarking images;

FIG. 7c indicates the steps in an embodiment of authenticating watermarked images when privacy control is used;

DETAILED DESCRIPTION OF PREFERRED EMBODIMENTS OF THE INVENTION

Figure 4:
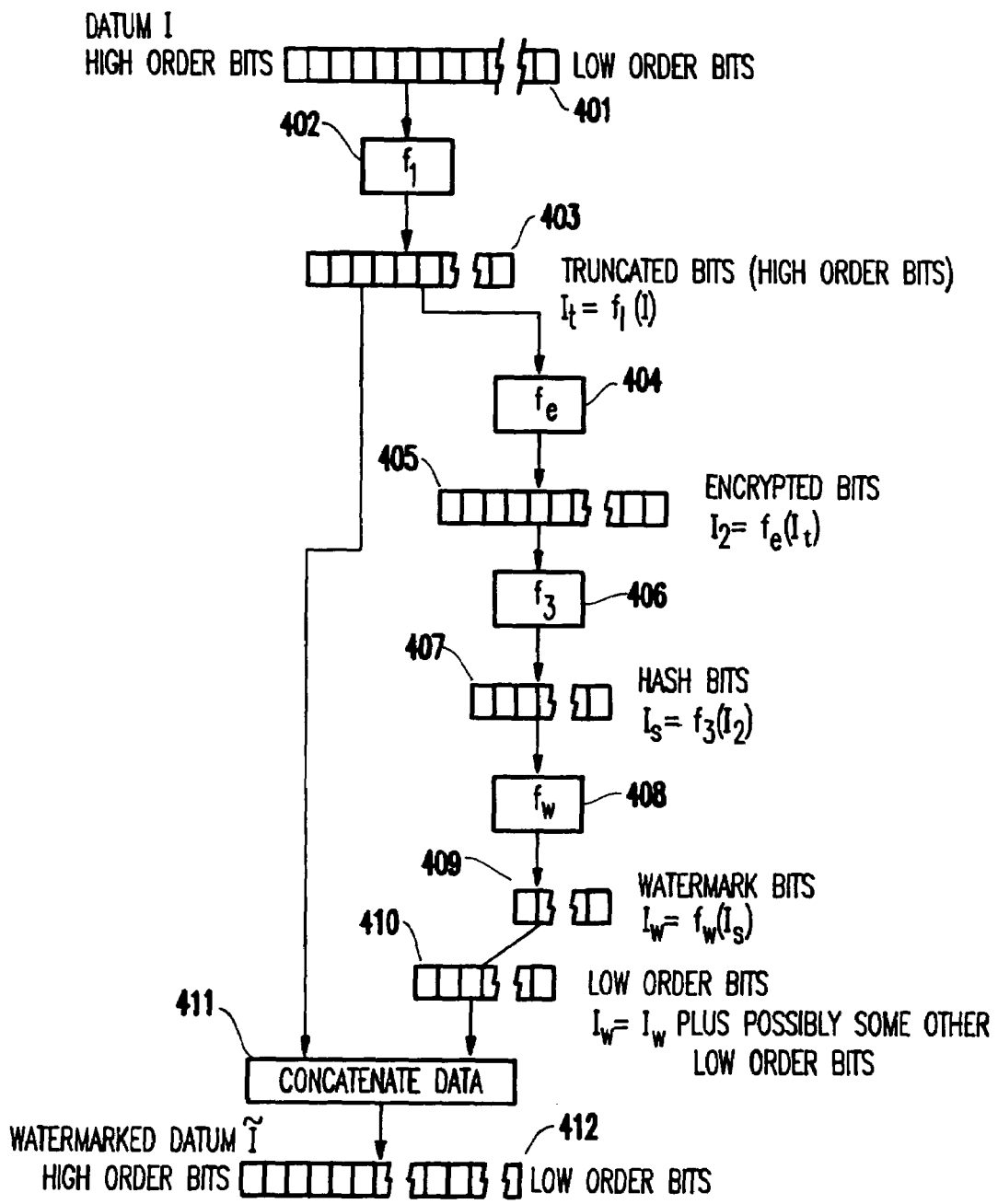
FIG. 4 illustrates the steps to watermark a data set in an embodiment of the present invention.

In general, a digitized human perceptible data set is presented as a $n_1 \times n_2 \times \ldots \times n_M$ array I of N-bit numbers or a collection thereof. For instance, M=1 for a standard sound track, M=2 for a gray-scale image. In the case of a stereo or more generally an m-track (with $m \geq 2$) sound track, one can either consider this as M=2 with $n_2$=m, or as $m \geq 2$ arrays with M=1. Similarly, a color image could be thought of as a single array with $M \geq 3$ or three or more arrays with M=2 (here, 3 is the minimal number of components for a color image). Thus, an audio-video document can be represented by an array with M=4 for the video and an array with M=2 for the (stereo) sound.

Some terminology will first be introduced to describe the terms used in later sections. The image I will be watermarked by its owner O who transforms it to a watermarked image Ĩ (in some cases, I is destroyed, in some cases, I never existed and the image is directly created in the watermarked form). The watermarked image is accessible by the customer C who wants to check that she/he access an authentic watermarked image of the owner O. The authentication can be made by an authentication agent A. Thus we have up to three parties, but any two of them can be identical in some cases. Some of the scenarios covered by this invention can be described as follows:

Scenario 1. O may want to check that some of his/her old images are still authentic, and may wish to authenticate them with no external assistance, in which case O=C=A.

Scenario 2. O may wish to be the only authentication agent (in which case A=O).

Scenario 3. O may prefer to enable any customer to authenticate with no need of external help (in which case A=C). Then the watermarking should be made using a Secret Key/Public Key (i.e., SK/PK) pair.

Scenario 4. The image could be sensitive documents such as bank account records, social security documents, etc. It would be desirable that A has no access to the human-readable content of the image, and no capability to watermark the image.

The general mechanism is decomposed into several steps to allow for several scenarios, but in some cases, one or several or these steps correspond to nothing being done.

FIG. 3a will now be used to describe the watermarking mechanism: The owner of a data set I constructs a watermarked data set Ĩ as follows. Starting with an initial data set I 301, the data set $I_t = f_1(I)$ 302 is extracted (via the map $f_1$). $I_t$ contains most of the content of the data set, including the human-readable content. One example of $I_t$ would be the higher order bits of the data set (in case of image or audio data). The data set $I_t$ is then converted to the data set $I_s = f_2(I_t)$ 303 via the map $f_2$. Depending on the application, $I_s$ can be identical to $I_t$ (i.e., $f_2$ is the identity function) or $I_s$ can be an encrypted or hashed version of $I_t$. This $I_s$ (303) constitutes the privacy control.

$I_s$ is then converted into the watermark $I_1 = V(I_s)$ 304 via a function V that is known to the authentication agent. The function V can depend on the owner of I. Then the watermarked image $\tilde{I}$ 305 is constructed by combining $I_1$ and $I_t$:

$$\tilde{I} = g(I_t, I_1)$$

Alternatively, $\tilde{I}$ can also be defined implicitly:

$$g(I_t, I_1, \tilde{I}) = 0$$

In this case, an iterative algorithm is used to construct $\tilde{I}$ from $I_t$ and $I_1$. In any case, a function g is used such that I (or $I_t$) is perceptibly similar to $\tilde{I}$. For example, in the case of an image or audio signal, $I_t$ can be all the data bits of I except for the least significant bits and $\tilde{I}$ is constructed by using $I_t$ as the high order bits, and $I_1$ as the least significant bits.

The function g also has the property that there exists extraction functions $h_t$ and $h_1$ that extract $I_t$ and $I_1$ from $\tilde{I}$, i.e., $I_t = h_t(\tilde{I})$ and $I_1 = h_1(\tilde{I})$. For example, in the case where $I_t$ is the higher order bits of $\tilde{I}$ and $I_1$ is the least significant bits of $\tilde{I}$, it is obvious how $h_t$ and $h_1$ are defined.

The transformation from I to $\tilde{I}$ as described above with reference to FIG. 2 and FIG. 3a creates a privacy encoded watermarked version of the original image.

FIG. 3b shows the verification process: a customer would like to have a watermarked image I 311 authenticated. The customer extracts $I_t$ 312 and $I_1$ 313 (using $h_t$ and $h_1$), constructs $I_s = f_2(I_t)$ 314 from $I_t$ and submits to the authentication agent the data sets $I_s$ 315 and $I_t$ 316. The authentication agent then uses function V to construct $I_1' = V(I_s)$ 317 from $I_s$ and compare $I_1'$ with $I_1$ 318. If they are identical (319), then the watermarked image $\tilde{I}$ is authentic. Otherwise, it is not (320).

To prevent anybody except for the owner to be able to watermark an image, public key cryptography may be used and V is decomposed as $V = V_1 \circ V_2$ where $V_1^{-1}$ is known publicly, but $V_1$ is secret and known only to the owner. Furthermore, it is considered computationally infeasible to determine $V_1$ given $V_1^{-1}$. In that case the authentication agent construct $V_2(I_s)$ and compares it with $V_1^{-1}(I_1)$. If they are identical, then the watermarked image $\tilde{I}$ is authentic. In many applications, $V_2$ can be chosen to be the identity function.

FIG. 3c will now be used to illustrate the verification process for the case where public key cryptography is used. The steps for the owner are the same as shown in FIG. 3b. The authentication agent, however constructs $V_2(I_2)$ 327 and $V_1^{-1}(I_1)$ 329. $V_2(I_s)$ is then compared with $V_1^{-1}$ in decision block 328. If the answer is yes, the watermarked data set $\tilde{I}$ is authentic (330). Otherwise, it is not (331).

In both FIG. 3b and FIG. 3c, if $I_s$ is an encrypted or hashed version of $I_t$, then the authentication agent cannot read the content of $I_t$ that contains the human-readable content of the data set. If in addition $I_1$ does not reveal the human-readable content of the data set (as is usually the case, since $I_1$ are the least significant bits), then the authentication agent can authenticate the data set without being able to read the human-readable content of the data set. This provides the privacy control aspect.

In a preferred embodiment, cryptographic techniques are used at two levels. First, they are used for privacy control, i.e., in the definition of $f_2$. Second, cryptography is used for authentication, i.e., in the definition of V.

FIG. 4 shows the details of how the owner of a data set I constructs a watermarked image $\tilde{I}$ in a preferred embodiment. A description of the specific cryptographic techniques used can be found in Handbook of Applied Cryptography, by Alfred J. Menezes, Paul C. van Oorschot and Scott A. Vanstone, CRC Press, 1997, the subject matter of which is incorporated herein by reference. Starting with an initial data set I 401, a truncated data set 403 $I_t = f_1(I)$ is extracted via the map $f_1$ 402. $I_t$ contains most of the content of the data set, including the human-readable content. For instance, $I_t$ can be constructed by keeping only the higher order bits of the original data set I.

The data set $I_t$ is then converted to the second data set 405 $I_2 = f_e(I_t)$ via the map $f_e$ 404. Depending on the application, $I_2$ can be identical to $I_t$ (in which case $f_e$ is the identity function) or $I_2$ can be an encrypted version of $I_t$. In some cases, $I_2$ will contain redundancies and be bigger than $I_t$: for instance, in the preferred embodiment, $I_t$ will be covered by several overlapping regions, each of which will be mapped to $I_2$.

The second data set $I_2$ is then used to compute the reduced data set 407 $I_s = f_3(I_2)$ via the map $f_3$ 406. It is possible that $I_s = I_2$, but in several applications, $f_3$ will be chosen as a hash function (to reduce the size of the data). In the case of scenario 3 or 4 described above, $f_3$ would more precisely be constructed as a cryptographic hash function H that might be publicly known. Then, given any message M such as $I_2$, it is easy for anyone to produce $I_s = H(M)$ given M, but considered computationally infeasible for anyone to find two different messages M and M' with the same hash value $H(M) = H(M')$. Also, it is considered computationally infeasible for anyone, given a hash value Y, to find a message M satisfying $H(M) = Y$. One such hash function is the Secure Hash Algorithm (SHA-1). In terms of $f_2$ of FIG. 3a, $f_2 = f_3 \circ f_e$.

Next, $I_s$ is used to compute the functional watermark $f_w$ 408. The functional watermark will associate an effective watermark $I_w$ 409 to I, computed as $I_w = f_w(I_s)$: here $I_w$ is an array of proper size. In some cases, $I_w$ will be the collection of all least significant bits ($I_1$) of the watermarked image, in which case we denote this as $I_w = I_1$, but it may also be only a subset of $I_1$ if one needs fast coding (such as in video) and/or as faint an effective watermark as possible.

The function $f_w$ will depend on the reduced image $I_s$, on the owner O, but also possibly on the time T and/or place P when and/or where the watermarking is done: in symbol, $f_s = F(I_s, O, T, P)$. In some applications, $f_w$ can be constructed using the SK part of a SK/PK pair (or a collection thereof to allow for cropping): the public part of the pair will be denoted by $f_p$. Then, the authentication agent A can check that $I_w$ is what should be computed as $F(I_s, O, T, P)(I_s) = f_w(I_s)$, but cannot compute $I_w$ out of Is, 0, T and P. In general, $f_p$ stands for the function needed to verify that $f_w$ is used for watermarking (in some case like in scenario 1, $f_p$ can be chosen as $f_w$).

Once $I_w$ is computed, it is used to generate the low order bits I, 410. As discussed before, $I_w$ 409 could be equal to $I_1$ or it could be a subset of $I_1$, in which case the other bits of $I_1$ are chosen to be as in I or to be arbitrary. The watermarked image $\tilde{I}$ 412 is then composed out of $I_t$ and $I_1$. For instance, one may choose $\tilde{I}$ as $I_t$ concatenated 411 with $I_t$. But more complicated protocols can be preferred.

The authentication of an image can then be implemented according to the precise protocol chosen to compose $\tilde{I}$, in a manner that should be obvious to anyone versed in the art of cryptography. It is practical to embed all information about O, T, and P (as needed) in a non-secret piece of $I_w$ (repeated many times over the image in case one allows for authentication of cropped images). The locations where such data is contained in $\tilde{I}$ could be standardized and serve as locators to ease the authentication process. In such case, A (who has access to $f_p$) needs only to be communicated $I_s$ and $I_w$ to perform the authentication and will be unable to guess what $I_t$ is if a cryptographic hash function is used as $f_3$. If a SK/PK pair is used, A will also be unable to forge a watermark for $I_t$.

Figure 5B:
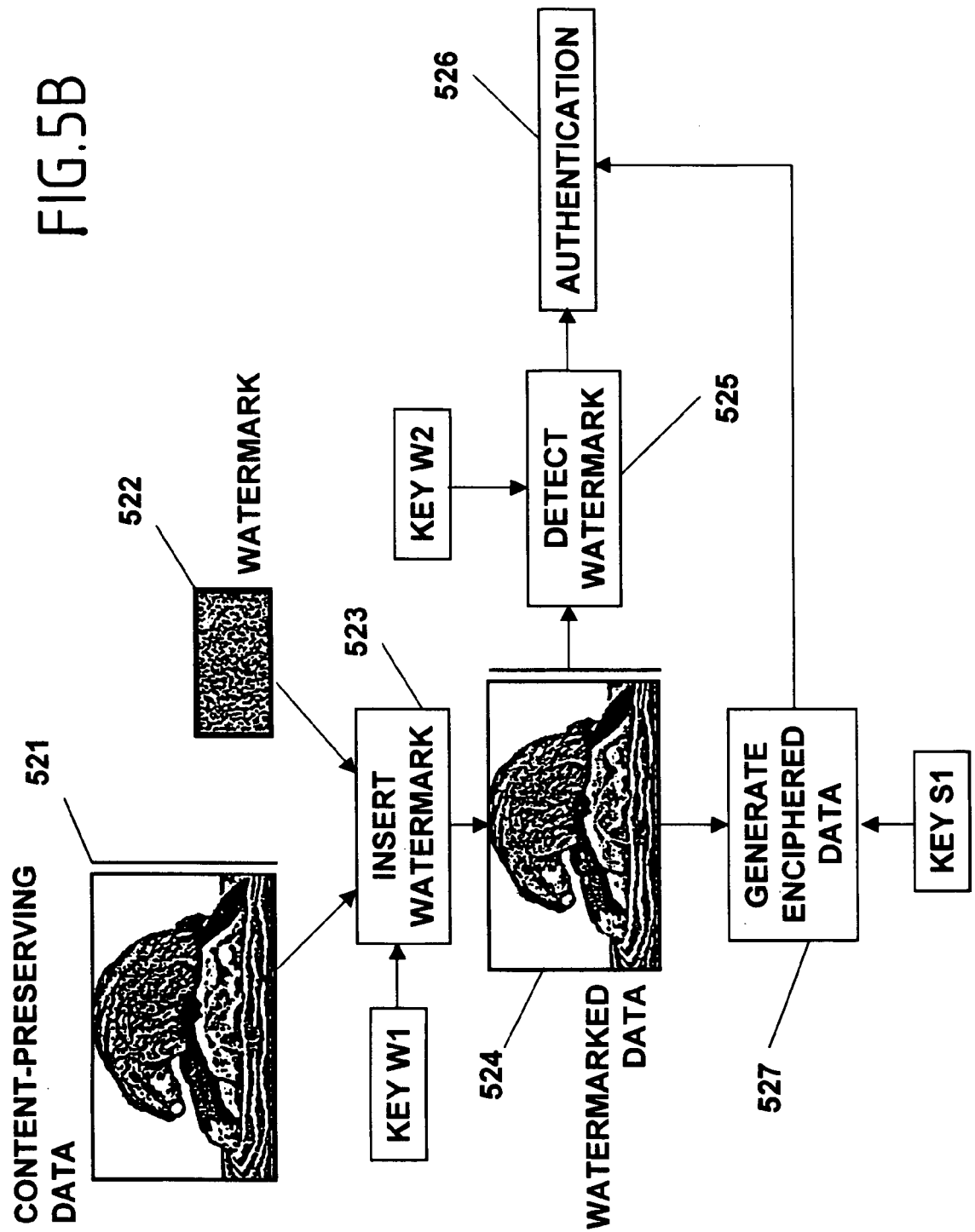
FIG. 5 illustrates a sample implementation of the process of watermarking an image and its authentication.

A schematic diagram of a sample implementation of the process of watermarking an image and its authentication is shown in FIGS. 5A–B. In FIG. 5A, a source image 501 is split 503 into a human-perceptible content-preserving portion 502 and a residual portion 504. This residual portion will be replaced by the watermark in the watermarked image. The content-preserving portion 502 is enciphered in block 505 for privacy control. The enciphered data 506 is then used in block 507 to construct a watermark 508.

Referring now to FIG. 5B, the watermark 522 is inserted into the content-preserving portion 521 in block 523 to generate the watermarked image 524. For authentication, block 525 extracts the watermark from the watermarked data and block 527 generates the enciphered data from the watermarked data. These two pieces of information are used in the authentication protocol 526.

Next, preferred embodiments for specific types of data sets will be described. Note that in general the uncompressed version of the data set is operated on.

Greyscale Images

The picture is m by n pixels, each of which is represented by 8 bits of information. The 7 most significant bits are the "high bits" and the eighth (least significant) bit is the "low bit". The watermarking process will respect the high bits but alter the low bits. Even though we assume that each pixel is represented by 8 bits of information, this implementation is easily adaptable by anyone skilled in the art to the case where each pixel is represented by N bits of information. The same can be said for other types of data sets, as described later.

Figure 6B:
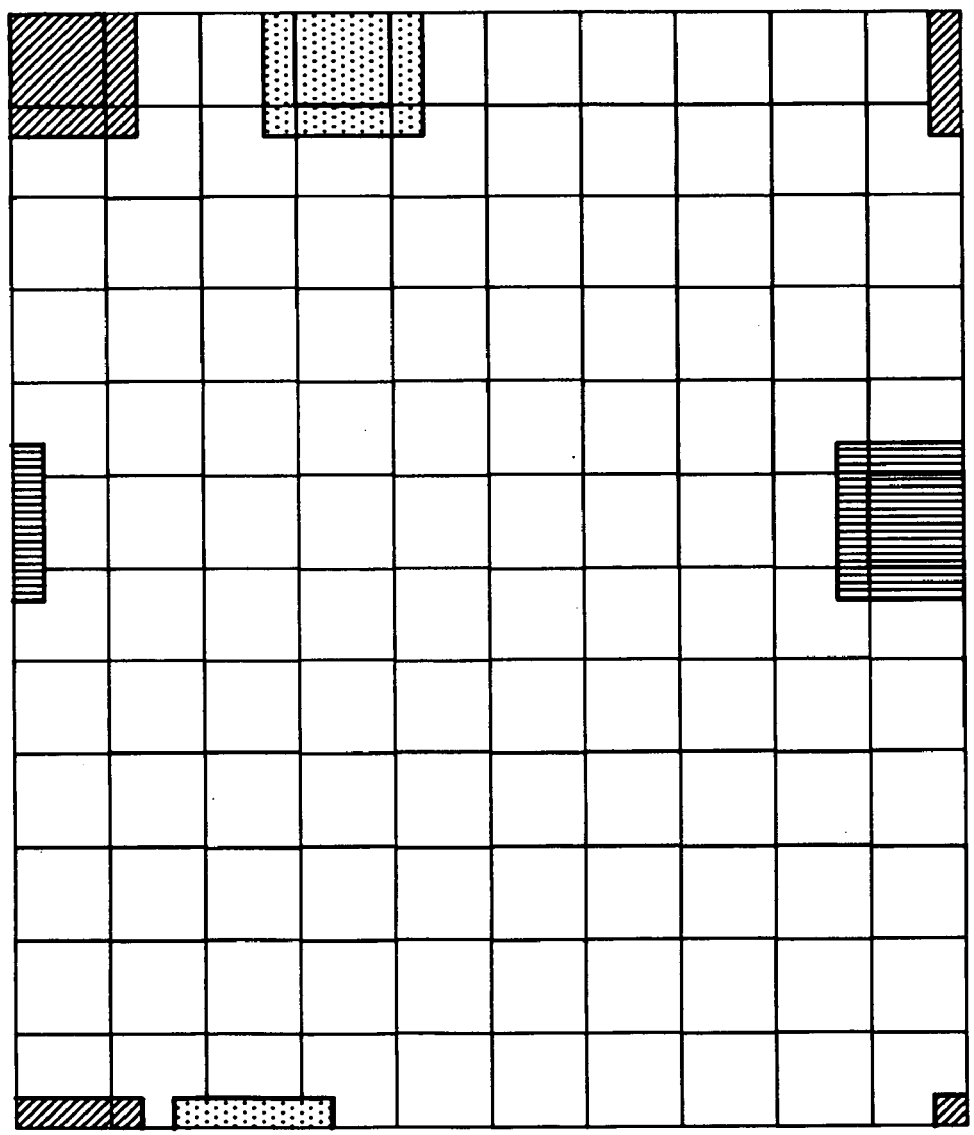
FIG. 6b illustrates how the large squares can wrap around the edges of the image.

Most of the picture (possibly excluding the border) is decomposed into small squares of 24 by 24 pixels such that each small square is embedded in the middle of a large square (of size 32 by 32 pixels). The large squares overlap but the small squares do not overlap, as shown in FIG. 6A. Periodic boundary conditions can be used in determining the large squares, as indicated in FIG. 6B. In other words, large squares that have portions lying outside the image border are "wrapped" around to the border at the opposite side.

As usual, the use of periodic boundary conditions allows use of the method for boundary points and interior points of the image in exactly the same way with no need of further adaptation. In the present case, periodic boundary conditions also allow for a further verification to determine whether an image has been cropped or not.

Figure 7B:
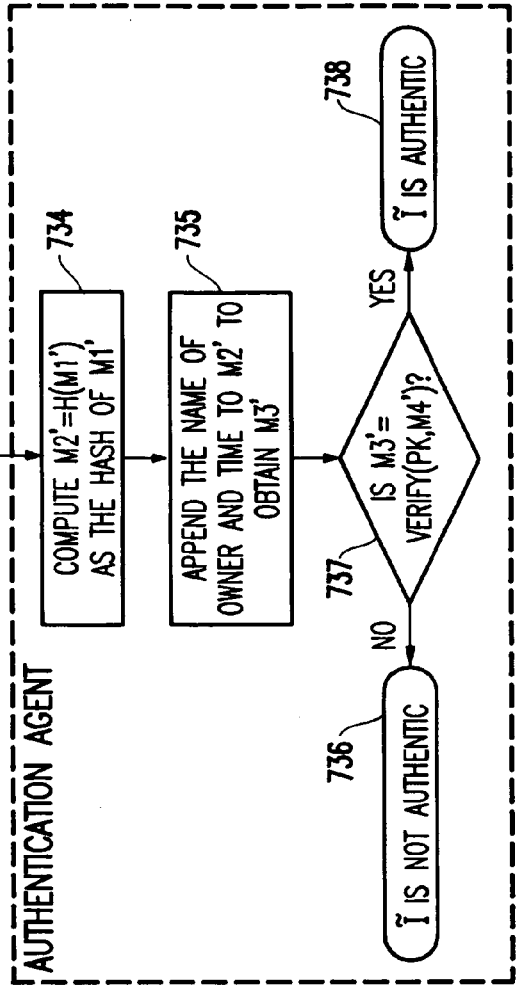
FIG. 7b indicates the steps in an embodiment of authenticating watermarked images when privacy control is not used.
Figure 7A:
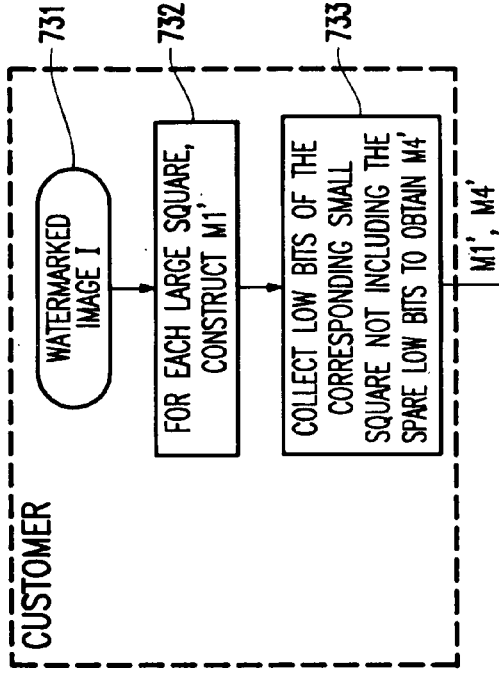
FIG. 7a indicates the steps in an embodiment for watermarking images.
Figure 8:
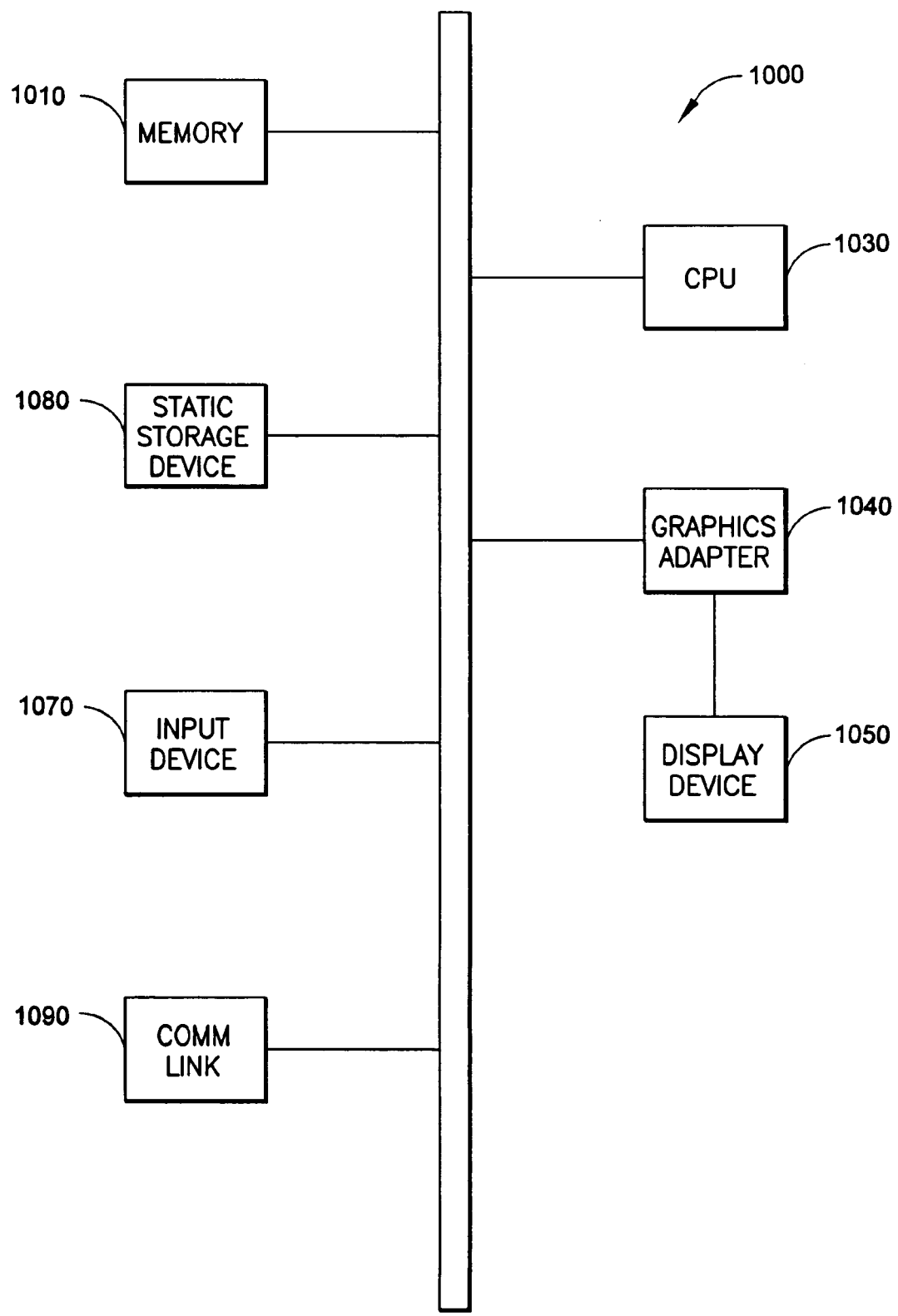
FIG. 8 is a block diagram of a computer processing system wherein the methodology of the present invention may be embodied.

Referring now to FIG. 7a, starting with a source image I 701 broken up into non-overlapping small squares and overlapping large squares with periodic boundary conditions, for each large square collect the high bits of all $1024=32\times32$ pixels (i.e. $7\times1024=7168$ bits) into a message Mi with 7168 bits 702. The collection of all these messages M1 form I2. Compute the 160-bit hash of this message M2=H(M1) with 160 bits where H is chosen as SHA-1 703. Append the owner's name and time to produce a 512-bit message M3 for each M1 704. Here the owner's name can include other data such as the name of the image, the date, or place of creation of the image.

The RSA protocol, described in U.S. Pat. No. 4,405,829, the subject matter of which is incorporated herein by reference, is a chosen method to generate and use a SK/PK pair in order to allow for public authentication. Several other methods could also be used. The signing function in the RSA protocol is denoted by SIGN and the verification (authentication) function in the RSA protocol is denoted by VERIFY.

Next, compute the RSA signature M4=SIGN(SK,M3) of 512 bits 705. Place these 512 bits in the low order positions of the $576=24\times24$ pixels in the small square, obliterating the existing low bits. Since there are 576 low order bits, there are 576−512=64 bits left for other data in each small square. These 64 bits will be called the spare low bits 706.

We choose the spare low bits to always be dispersed in a standardized way in the small squares so as to be used as locators. In all cases when SK/PK pairs are used, the owner's name, time, and public key PK, are assumed to be available to anyone who wants them. We choose to embed the owner's name and the time (or some portion of it) in the spare low bits (of possibly several squares). PK can also be recalled there (possibly using the spare low bits of several squares), but should also be publicly accessible by other means.

Assume that a customer wishes to verify whether a data set (or a part of it) has been altered. He has access to a portion of the data; it may have been cropped, but he still wants to verify that the portion available to him is the original unaltered version.

If the data set has been cropped, the alignment of large squares within the picture needs to be determined. If the name of the owner has been embedded in the spare low bits, then it can be searched for in the data set to find the correct alignment. Another possibility is to use a small fixed synchronization pattern embedded into the spare low bits to determine the correct alignment.

Alternatively, a trial and error method can be used to determined the correct alignment by repeating the verification procedure $576=24\times24$ times, once for each possible alignment.

Cropping results in border pixels of the image possibly not being verifiable. The amount of these non-verifiable border pixels can be used to determine whether the image has been cropped or not (or whether the image has been altered to fake the fact that the image is cropped).

The customer proceeds as follows. Referring now to FIG. 7b, starting from a watermarked image Ĩ 731, for each large square of the data set, collect the high bits into a message M1' 732. Collect the low bits of the corresponding small square and produce a 512-bit message M4' 733. The customer then has two choices:

1. Submit M1' and M4' to the authentication agent (FIG. 7b);
2. Compute the hash M2'=H (M1') and submit M2' and M4' to the authentication agent (FIG. 7c).

In either case, the authentication agent can compute or retrieve M2' (734 in FIG. 7b or 754 in FIG. 5c). In case M2' (rather than M1') is submitted to the authentication agent, the authentication agent has no access to M1' and thus cannot read the human-readable content of the data set. The authentication agent then performs the authentication as follows. First it collects the owner's name, the time and PK. Alternatively, the owner's "name" and/or "time" and/or PK could have been collected by the customer and submitted to the authentication agent, for instance when they are embedded into the spare low bits of the watermarked data sets. Next the name and time is appended to M2' to obtain M3' 735. Then, as shown at decision block 737, compute VERIFY (PK,M4') and see whether M3' is equal to VERIFY (PK,M4'). All this can be done with publicly available information. If M3'=VERIFY (PK, M4'), then this implies that M4'=SIGN (SK, M3').

If each large square satisfies the verification equation 738, then the customer can be sure that the data has not been altered (other than by cropping).

When M2' rather than M1' is sent to the authentication agent, the authentication flowchart is as shown in FIG. 7c. All the steps are identical as in FIG. 7b, except that the computation of M2' is done by the customer rather than by the authentication agent.

The foregoing embodiment of the present invention focuses on gray-scale images, however, the invention is readily applicable to other data sets in a more general sense, so that the word "image" could be replaced by any other human perceptible data sets like color images, video and audio, as will now be explained.

Color Images

With color images, each pixel has 24 bits, 8 bits for each of three primary colors. We will use three bits of each pixel (the lowest bit of each primary color) as our "low bits", and the other 21 bits as "high bits". The small square will be 14×14 pixels, and the large square 22×22. So the low bits will number 588=3×14×14, and the high bits will number 10164=21×22×22. The number of spare low bits is now 588−512=76. The rest of the scheme remains unchanged.

Audio Waveforms

With audio waveforms, assume the data set is a one-dimensional array of samples, with each sample a 16 bit number. It is then relatively straightforward to adapt to this case. For example, instead of small and large squares, we have small and large windows of data with the small windows in the middle of the large windows. We use small windows of 600 samples, while the large windows will be 1000 samples. The large windows should overlap, while the small windows do not. The rest of the scheme is similar to the grayscale image case and can be deduced by anyone who understands this invention.

Video

Because video data is generally processed at high speed, this application requires rapid implementation. One way to increase the speed of the algorithm is to use only a subset of the low bits dispersed over the image as carrying the watermark. The locations of these points are obtainable from PK and/or readable data on the first image and vary from one frame to the next. If possible, cropping is intended, such data can be repeated periodically. The watermark on each frame depends on the image on that frame and on neighboring frames to prevent undesirable cropping and cut and paste attacks but allow for detectable cropping. Marking only on dispersed dots can also be used on still images if a watermark as faint as possible is desired.

The above described preferred embodiments of the invention demonstrate the following advantages, among others.

The small squares are embedded into large squares to prevent a cut and paste attack, i.e. an image constructed by rearranging pieces of an authentic image will cease to be authentic.

In the case where the third party submits M2' and M4' to the authentication agent for verification, the authentication agent cannot read the human-readable content of the watermarked data set. Therefore, this provides a level of privacy to the human-readable content of the data set.

The use of public-key cryptography means that the authentication agent can authenticate a data set but cannot watermark a data set.

The watermark is embedded in the least significant bits of the data set, therefore making it imperceptible.

If the watermarking of the original image adopts periodic boundary conditions, then the authentication agent can determine whether an image has been cropped or not by checking whether the border is authenticated or not.

If the watermarked image has been altered, the authentication agent can approximately determine the location of the alteration.

Other embodiments of the present invention involving watermarking and/or authenticating an image such as a vector graphics image will now be described. One skilled in the art would understand that the present invention is applicable to various types of images. A vector graphics image is described as a preferred example.

A method of watermarking a vector graphics image, which we denote I, will now be described. We presuppose the availability of a digital signature mechanism. Such a mechanism defines two functions: sign(I); and verify (I, s). The function sign is provided an image I and computes its digital signature based upon a digital signature algorithm. This digital signature is a sequence of binary bits which we denote B. The operations of the sign function may be represented as follows: sign: I→B. The function verify is provided an image I and a digital signature s, and returns true if the signature s corresponds to the image I (that is, if s=sign (I)), and returns false if the signature s does not correspond to the image I (that is, if s # sign (I)). The function verify may be represented as follows: verify: IXB ↦{true, false}. A more detailed description of various implementations of the sign and verify functions as tailored to specific applications can be found in Schneier, B., "Applied Cryptography," Wiley and Sons, 1996, the subject matter of which is incorporated herein by reference.

There are many different vector graphics formats available. The following will describe a generic format which will apply to all such formats, as follows. Generically, a vector graphics image includes an ordered sequence of strokes. Each stroke is a continuous curve. For example, the curve generated by placing a pencil on a piece of paper and then moving the pencil without lifting it from the surface would be a stroke. Each stroke includes an ordered sequence of points, indicating the coordinates through which the stroke is passing. The following discussion will assume that each point is a two dimensional coordinate value, and that the stroke is formed by joining each point with a line segment. Every point, stroke or image may have an attribute associated with it. The information contained in each attribute is application-specific, but typically each stroke will have an attribute describing its color. Other example attributes are the time at which each point was traversed, the width of a stroke, and the name of the person who generated the image.

Vector graphics formats utilized by those skilled in the art may differ from the generic format discussed above, for example, by considering each image to be a page, and considering a document to be an ordered sequence of such pages. Additionally, instead of an image being composed of strokes, each image may be composed of an ordered sequence of scribbles, each scribble being an ordered sequence of strokes. Other graphics formats may define the points of a stroke in three dimensional coordinates or draw cubic splines between points of a stroke, instead of line segments. One skilled in the art will be able to account for the differences between the described format and others found in practice.

We now describe the process of watermarking an image using digital signatures so as to:

not damage the utility of the image, and enable the authenticity of the image to be verified.

Figure 9:
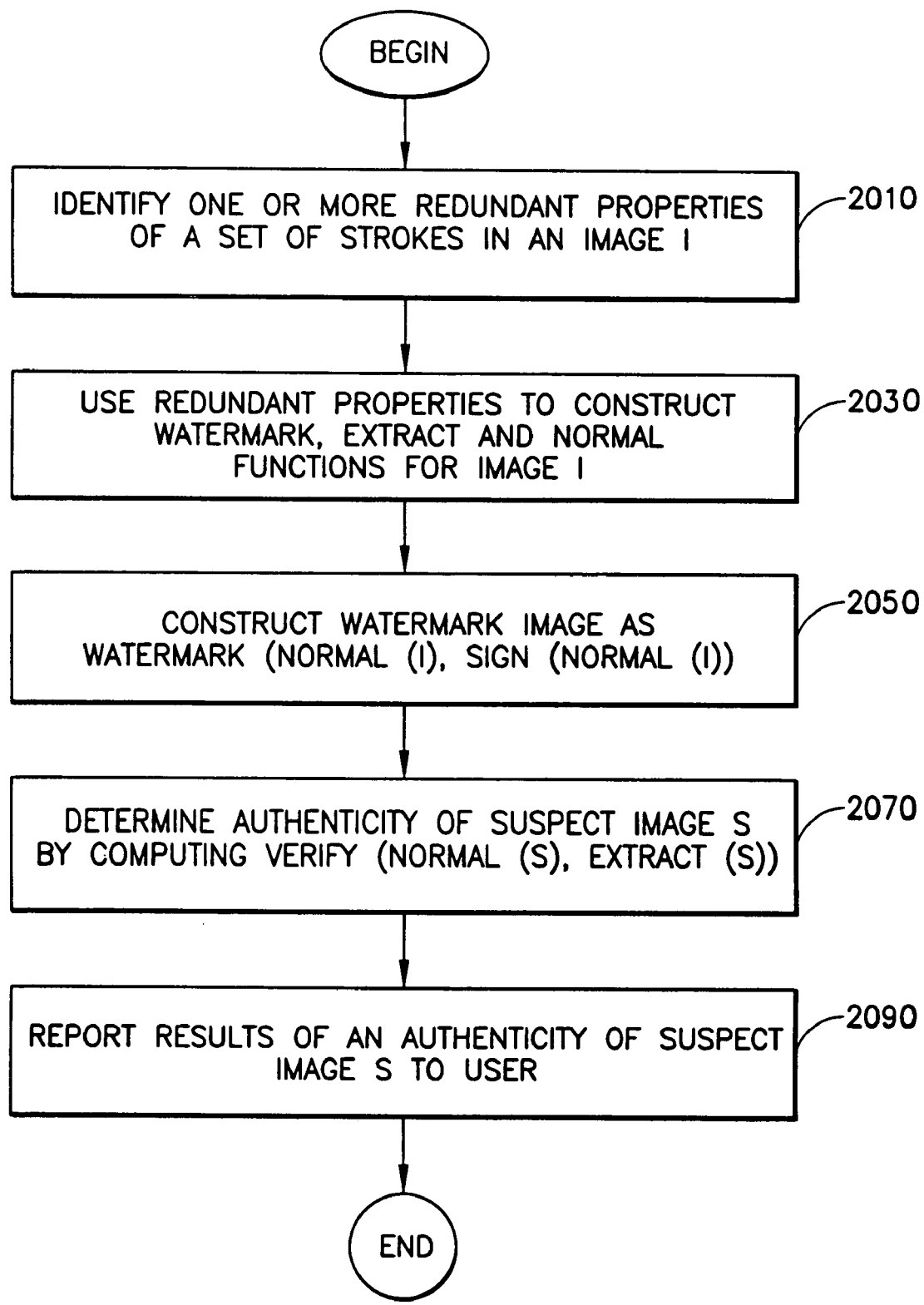
FIG. 9 is a flow chart illustrating the vector graphics image watermarking/authentication scheme of an embodiment of the present invention.

As illustrated in FIG. 9, the process includes four steps. In step 2010, one or more redundant properties of a set of strokes of the image are identified. As described above, watermarking requires the modification of the image; yet, in order for the utility of the image to be retained, the watermarking process should be applied to properties that are redundant in the image (i.e., properties that when changed do not affect the utility of the image when viewing the image). The redundant properties of the strokes of a given image is highly application dependent. Most previous watermarking methods attempt to make modifications which are "undetectable" to the human eye. This not only depends upon the sensitivity of the assumed human viewer, but there exists images which are absolutely identical to a viewer but which are markedly different to some commercial applications. For example, most right-handed people write the digit "0" as a single, clockwise stroke. Since the points in a vector graphic stroke are ordered, the fact that the stroke was written clockwise is captured. The identical stroke written in a counterclockwise fashion would be identical when rendered upon a medium, but would be considered very different to handwriting recognition software.

In vector graphic images, the possible sources of redundancy include:

coordinate values of points number of points on a stroke relative ordering of points of a stroke ordering of strokes in an image manner in which different strokes cross/intersect each other number of strokes in an image attributes assigned to each component of an image manner in which rendered curves are divided into strokes (for instance, a single line could be one stroke, or two strokes which happen to intersect at the middle.)

In step 2030, given the redundant properties for the set of strokes as identified in step 2010, three functions are constructed as follows:

watermark: I×m→I extract I→m normal I→I

Exemplary embodiments for constructing these functions is set forth below in more detail. In general, given an image I and a bit sequence m, the function watermark (I, m) produces a watermarked image I' by modifying the redundant properties of the set of strokes of the image I as generated in step 2010 according to the bit sequence m. Given a watermarked image I' and the redundant properties of the set of strokes in the image I from which the watermarked image I' was derived, the function extract (I') computes the bit sequence m. The function normal (I) takes an image I and produces another image I". Typically, but not necessarily, I" is equivalent to watermark (I, $\vec{O}$), where $\vec{O}$ is a bit sequence including all 0 bits.

In order to enable authentication, the three functions described above must satisfy the following properties for any arbitrary image I and bit sequence m:

watermark (I, m) is sufficiently similar to the image I such as to not affect the utility of the image when viewing the image;

normal (I) is sufficiently similar to the image I such as to not affect the utility of the image when viewing the image;

extract (watermark (I, m))=m; and normal (watermark (I, m))=normal (I)

In step 2050, given an image I and the set of functions constructed in step 2030, an authenticatable, watermarked image A is constructed as watermark (normal (I), sign(normal (I))).

In step 2070, given a suspect image S of suspect authenticity, it is determined if the image S is authentic by computing verify (normal (S), extract (S)). If the verify function returns true, the image S is authentic. If the verify function returns false, the image S is highly unlikely to be authentic.

Finally, in step 2090, the result of the authentication of step 2070 is reported to the user via I/O device.

Figure 10:
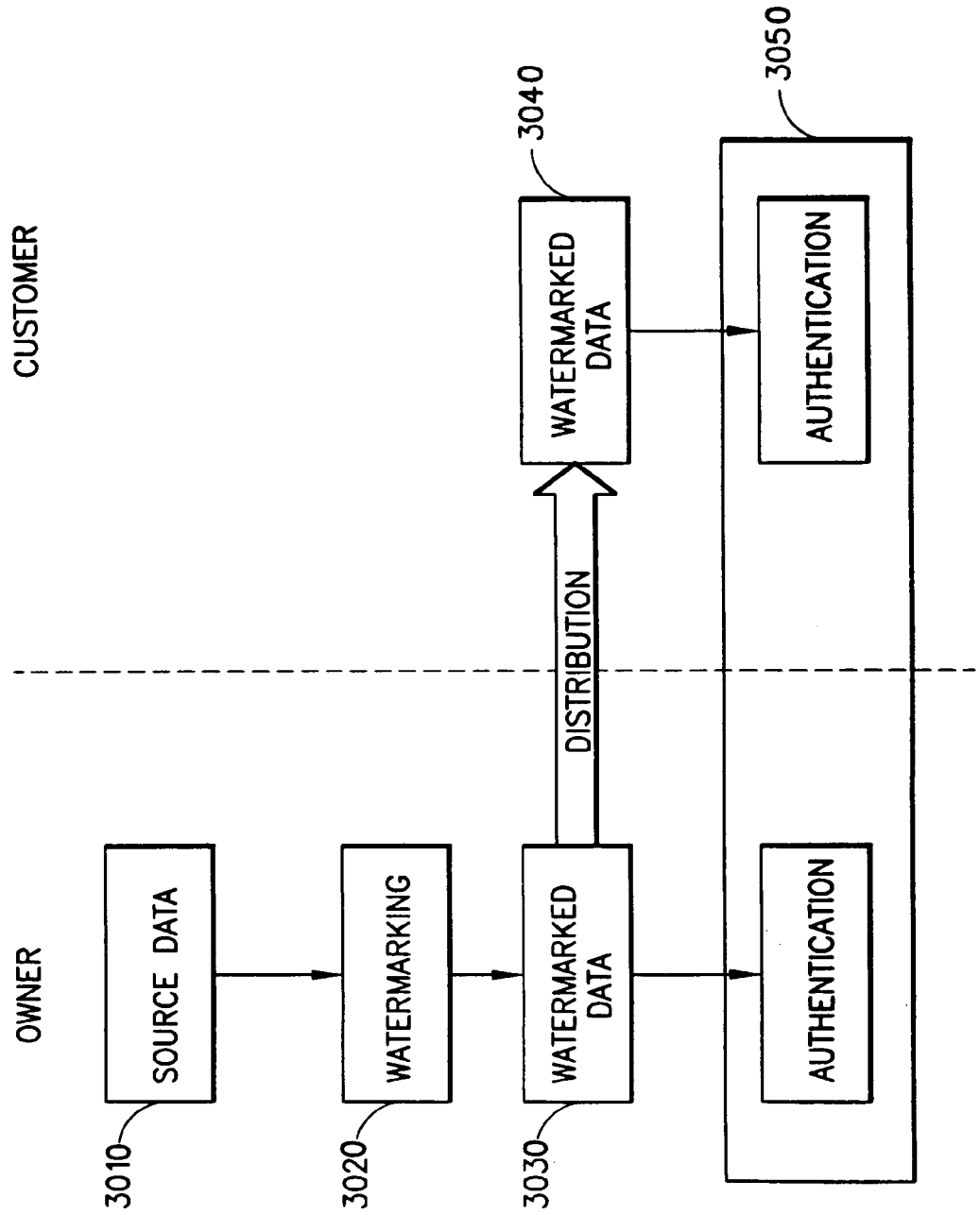
FIG. 10 is a flow chart illustrating system whereby the watermarking and/or authentication techniques of an embodiment of the present invention are used for image verification and/or authentication.

In an exemplary embodiment of the present invention, the watermarking and/or authentication techniques presented herein may be used for image verification and/or authentication. As shown in FIG. 10, in step 3020 the OWNER applies the watermarking scheme of step 2050 as described above to a source image 3010 to obtained a watermarked image 3030. The watermarked image 3030 is distributed to CUSTOMER 3040. Both the OWNER and CUSTOMER preferably authenticate the watermarked image by means of the watermark in step 3050 utilizing the authentication of step 2070 described above.

In an alternate embodiment of the present invention, the watermarking techniques presented herein may be used in accordance with the authentication system described in U.S. patent No. (application Ser. No. 09/059,498), filed on Apr. 13, 1998, commonly assigned to the assignee of the present invention, the subject matter of which is incorporated herein by reference in its entirety.

We now present ten examples of watermark, extract and normal functions described above, each of which takes advantage of a difference source of redundancy. Unless otherwise stated, in the following normal (I) will be defined to be watermark (I, $\vec{-0}$). Note that a practitioner skilled in the art may combine one or more of these exemplary embodiments to generate a watermarked image.

Modification of LSB of Point Coordinates

In many vector graphic formats, the coordinates of points are specified with a higher degree of accuracy than necessary. For instance, it may be possible to capture differences in point coordinates to within an angstrom distance. One can therefore make small changes to these coordinates without creating notable differences in the resulting images.

In an image I, consider the sequence of coordinate values defined by the sequence of all the points in all the strokes of the image. In this example, the function watermark (I, m) may be defined to be the image generated by replacing the least significant bits (LSBs) of each of these value by the bits in the bit sequence m. In this example, the function extract (I') extracts the bit sequence m from the (replaced) least significant bits in the coordinates of the image I'.

Figure 11:
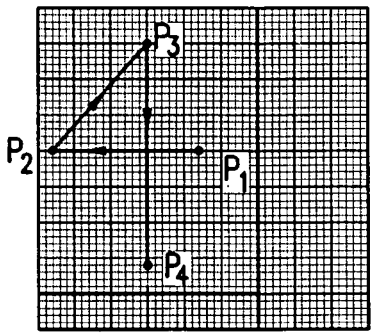
FIGS. 11–15(d) are pictorial illustrations of exemplary embodiments for watermarking vector graphics data according to the present invention.
Figure 12:
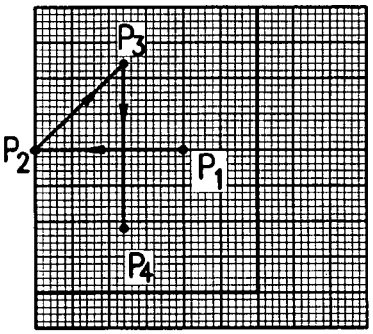
Figure 13:
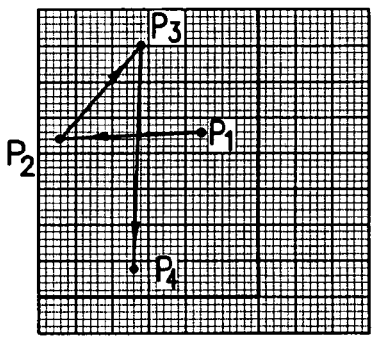

A pictorial illustration of this exemplary embodiment is illustrated in FIGS. 11, 12, and 13. FIG. 11 illustrates a small stroke, including 4 points. FIG. 12 illustrates the stroke from FIG. 1, after being normalized by this method, under the assumption that the last two bits of the coordinate values are insignificant (in other words, the stroke from FIG. 11 is specified with four times as much precision as necessary). Note that all the coordinates of the points in FIG. 12 have 0 as their two LSB's. In FIG. 13, the normalized stroke of FIG.

12 is watermarked with the 16 bit sequence "0111111010110100". The x coordinate of the first point has its LSBs replaced by the first two bits of the bit sequence ("01"), the y coordinate contains the next two bits ("11"), etc.

There may be some minor variations in this technique. For example, instead of modifying the LSB of each coordinate, one can instead modify a predetermined subset of the coordinates. Example subsets are: i) the first point of each stroke; ii) the x-coordinates of each point; or iii) those points within a certain region of the image (being careful that modification of those points does not cause the points to leave the region).

Figure 14:
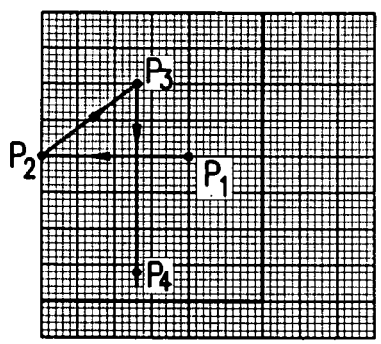
Figure 15A:
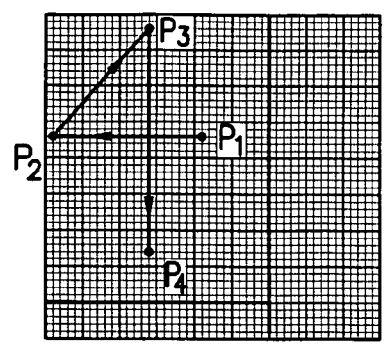

In another example, instead of modifying each coordinate value, one may modify just the coordinate of the first point of each stroke and then shift the remaining points of the stroke by the same amount that the first point was moved. In other words, the entire stroke is shifted as a unit, instead of moving points independently. A pictorial illustration of this exemplary embodiment is illustrated in FIGS. 14 and 15. In FIG. 14, the stroke of FIG. 11 is normalized by moving the first point $p_1$ such that the LSBs of the point $p_1$ are "0", and moving the other points of the stroke ($p_2$, $p_3$, $p_4$) the same amount. In FIG. 15, normalized stroke of FIG. 14 is watermarked with the 4 bit sequence "0111" by: setting the two LSBs of the x coordinate of point $p_1$ to "01" and the two LSBs of the y coordinate of point $p_1$ to "11"; and moving the other points ($p_2$, $p_3$, $p_4$) correspondingly.

Modification of Attribute Values

One can take advantage of the presence of attributes by encoding information in them. Moreover, some image formats allow addition of new attributes, or contain unused attributes. In these cases, the bit sequence m of the watermark function can be divided up into segments, wherein the length of each segment is short enough such that the segment can be contained in an attribute value field associated with the image. In this exemplary embodiment, given an image I, the function watermark (I, m) replaces successive attribute value fields of the image I with corresponding segments of the bit sequence m; and the function extract (I') extracts the segments from the succession of attribute value fields associated with the image I', and reassembles the segments to form the bit sequence m.

In addition to, or instead of, the above technique, frequently attributes contain information about the color of strokes, or time stamps. Often this information is specified to a greater degree of precision than necessary for most applications. Therefore, one can encode information in the least significant bits of the attribute value fields for such attributes. For example, consider an image I and a sequence of attributes associated with the image I. In this example, the function watermark (I, m) replaces the least significant bits of the attribute value field for each attribute in the sequence with successive bits from the bit sequence m; and the function extract (I') extracts the least significant bits from the sequence of attribute value fields associated with the image I', and reassembles the extracted bits to form the bit sequence m.

Addition of Redundant Points

Consider three consecutive points on a stroke. If these points are co-linear, then the stroke will be rendered identically if the middle point were removed. Such points are called redundant. The presence or absence of such redundant points can be used to encode information. Since mathematical co-linearity is an impractical solution, preferably co-linearity is defined with a tolerance value tol, and three points are considered to be co-linear if the middle point is within a distance corresponding to the tolerance value tol from the line joining the other two points.

In an exemplary embodiment, consider an image I wherein the function normal (I) considers every sequence of three consecutive points in each stroke in the image I. For each sequence of three consecutive points, the distance between the middle point and a line connecting the two outside points is computed. If that distance is less than the tolerance value tol, the middle point is removed. Preferably, this operation is repeated until no redundant points exist. In order to watermark an image, the image is first normalized and then redundant points are added to the image. A number of different methods may be used to encode information using such redundant points.

The first method is referred to as parity encoding. In this method, the function watermark (I, m) cycles through the bit sequence m and identifies the i-th stroke (ignoring strokes which only contain one point) in the image that contains an even number of points if and only if bit i of the bit sequence m is 0. A new image is constructed by copying the strokes of the image I, and then adding redundant points as necessary such that i-th stroke the parity constraint as identified above. The function extract (I') calculates the parity (i.e., odd or even number of points in a given stroke) for each stroke, and reconstructs the bit sequence m from the parity value for each stroke.

The second method is referred to as relational encoding. In this method, the function watermark (I, m) computes a new image by adding n redundant points to the image, where n is the number of bits in the bit sequence m. The method of selecting which strokes or line segments should have redundant points inserted into them is irrelevant for this encoding. Each redundant point r is, by definition, added between two points of a stroke, which we denote $p_1$ and $p_2$. The point r represents a "0" if and only if the point r is closer to $p_1$ than to $p_2$; otherwise the point r represents a "1". A practitioner experienced in the art will recognize numerous variations on this encoding, such as dividing the line between $p_1$ and $p_2$ into several regions. The function extract (I') examines each redundant point r in the image I' to determine if the point r is closer to $p_1$ than to $p_2$, and reconstructs the bit sequence m from the results of this conditional test.

Addition of New Strokes

It is possible to add new strokes to an image without damaging it, as long as the added strokes are either insignificant, or can be distinguished from the remainder of the image.

A stroke can be insignificant for a number of reasons:

(a) the stroke can be completely obscured by existing strokes. That is, the line segments covered by the stroke can be already covered by previous strokes;

(b) the stroke can cover too small an area to be noticeable. As an extreme case, strokes including single points would rarely be significant. Notice that a stroke can be arbitrarily long and still cover a small area. For instance, the bits $\{b_1, b_2, \ldots b_n\}$ of the bit sequence m can be encoded by a stroke with coordinates $\{((x+b_1), y), ((x+b_2), y), \ldots ((x+b_n), y)\}$. This stroke will cover only two pixels of the image, despite being n points long;

(c) the stroke can have an attribute which causes it to be inconsequential. For instance, if the background color of the image is considered to be white, any white strokes will be invisible to humans. A system might define a "watermark" attribute, and strokes which have this attribute are ignored by other applications.

Strokes can be added to an image, even if they are noticeable to the application, if they can be distinguished in some fashion from the important image content. For example, a number can be written legibly across the top of the page. More generally, a region can be defined in which all strokes will be considered to be watermarks. Colors or other stroke attributes could be also used for this purpose.

Given any of the above methods of determining inconsequential strokes, the function normal (I) removes any strokes in the image I which are inconsequential. An experienced practitioner of the art can easily determine a method to add/detect an inconsequential stroke s which encodes a given bit sequence m. In this method, the function watermark (I, m) adds the stroke s to the image I, and the function extract (I') extracts the stroke s from the watermarked image I' and reconstructs the bit sequence m encoded by the strokes.

Breaking Strokes

Consider a stroke s, which traverses a certain path. By choosing a point p on the path, one can break s into two stokes $s_1$ and $s_2$ which together cover the same path as s. The stroke $s_1$ will include the portion of s up to p, while $s_2$ starts at p and includes the remainder of s. We call this process—"breaking" the stroke s. The reverse process—replacing two strokes with a common endpoint by a single stroke covering the same path—we will call "merging."

Since $s_1$ and $s_2$ cover the same path as s, breaking s will not be detectable by many applications. The fact that stroke s has been broken is observable because $s_1$ and $s_2$ share a common endpoint.

In this exemplary embodiment, the function normal (I) merges all strokes which share a common endpoint. In this example, the function watermark (I, m) may break stroke number i of normal (I) if and only if bit i of the bit sequence m is 1. The function extract (I') examines each stroke in the image I' to determine whether the stroke has been broken, and reconstructs the bit sequence m based upon the results of this conditional test.

In another example, a subset S of strokes in normal (I) may be selected; and if the i-th bit of the bit sequence m is 0, then the i-th element of S will be broken with a point closer to the start of the stroke than the end. Otherwise, the stroke will be broken with a point further from the stroke's start. The function extract (I') examines each broken stroke in the image I' to determine whether the stroke has been broken with a point closer to the start of the stroke than the end, and reconstructs the bit sequence m based upon the results of this conditional test. A practitioner experienced in the art will easily be able to produce minor variations of these methods.

Modification of Overlapping Strokes

Figure 15B:
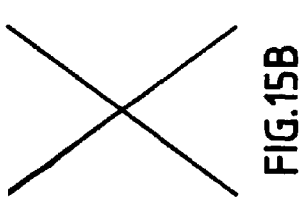
Figure 15C:
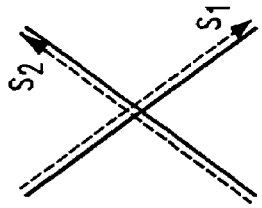
Figure 15D:
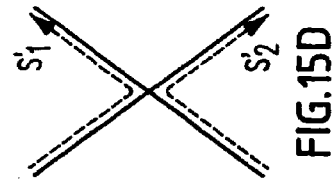

It is common for different strokes to overlap. For instance, a handwritten "t" is usually drawn with two strokes, one horizontal and one vertical, which cross. Information can be conveyed by the manner in which such crossings occur. For example, consider the two lines in FIG. 15(b). These lines meet at point p, and could be drawn by the strokes $s_1$ and $s_2$, as shown in FIG. 15(c). However, the same lines could also be drawn by the strokes $s'_1$ and $s'_2$ shown in FIG. 15(d). Therefore, substituting strokes $s'_1$ and $s'_2$ for $s_1$ and $s_2$ in a graphics image would leave the image unchanged to a viewer, and such substitutions could be performed in order to encode a watermark.

In an exemplary embodiment, the function watermark (I, m) identifies strokes which overlap and defines a procedure for deciding the default manner in which strokes should overlap. In addition, the function watermark (I, m) generates an image that is identical to the image I except in the manner in which overlapping strokes are traversed. More specifically, if bit i of bit sequence m is 0, the i-th overlapping strokes of I will be traversed in the default manner, otherwise the i-th overlapping strokes of I are traversed in some other fashion. The function extract (I') examines each overlapping stroke in I' to determine if the overlapping stroke overlaps in the default manner, and reconstructs the bit sequence m based upon the results of this conditional test.

Reversing Strokes

In many applications, the direction in which a stroke is traversed is immaterial. That is, if a stroke the points $\{p_1, p_2, \ldots, p_n\}$, then replacing the stroke with one whose points are $\{p_n, p_{n-1}, \ldots, p_1\}$ will not change the result. This fact can be used to construct a watermark that encodes information. An exemplary method of doing so is the following:

If s is a stroke whose points are $\{p_1, p_2, \ldots, p_n\}$, the function reverse (s) returns the stroke whose points are $\{p_n, p_{n-1}, \ldots, p_1\}$. In addition, a metric, denoted <, is defined based upon the coordinate values of the points. For example, one may consider $p_1 < p_n$ if and only if the following:

the x coordinate value of $p_1$ is less than the x coordinate value of $p_n$; or the x coordinates of $p_1$ and $p_n$ are equal and the y coordinate of $p_1$ is less than the y coordinate of $p_n$.

We say that s is ascending if $p_1 < p_n$, and that s is descending if $p_n < p_1$. Note that if $p_1 \neq p_n$, then s is ascending if and only if reverse(s) is descending. We will refer to strokes for which $p_1 \neq p_n$ as directed strokes.

In this exemplary embodiment, given an image I and the bit sequence m, the function watermark (I, m) generates an image that is identical to the image I except in the manner in which directed strokes are represented. More specifically, if bit i of bit sequence m is 1, the i-th directed stroke of I is reversed so that it is ascending. The function extract (I') examines each directed stroke in the image I' to determine whether the stroke is ascending or descending, and reconstructs the bit sequence m based upon the results of this conditional test.

Watermarking Without Authentication

For many applications, watermarking is needed but authentication is unnecessary. Naturally, one can simply apply the above techniques to watermark images, and just ignore the steps involving authentication. However, without authentication one does not need to have a computable normal( ) function, and this allows greater flexibility in the watermarking process. The necessary requirement is that extract (watermark(I, m)) is equivalent to m. For the above sub-techniques, the relaxed requirements have the following consequences:

(a) Modification of LSB of coordinates: Since all that is necessary for the extraction process is the LSB of the co-ordinates, one can change the more significant bits of the coordinates freely. This could be done, for instance, to make the strokes appear less "jagged";

(b) Addition of redundant points: In the methodology described above, the first step of watermarking was normalizing the original image. This was necessary to avoid confusion between added redundant points and ones that were originally present. However, without authentication this step is unnecessary, and redundant points can be added or subtracted from the original image; and (c) Breaking strokes: the first step in the watermarking process described above was to normalize the image by merging strokes with common endpoints. As with the previous case, this step is unnecessary: watermarking can proceed by breaking and merging strokes of the original image.

While the overall methodology of the invention described above generally relates to a single environment, the invention can be embodied in any number of different types of systems and executed in any number of different ways, as would be known by one ordinarily skilled in the art.

Figure 16:
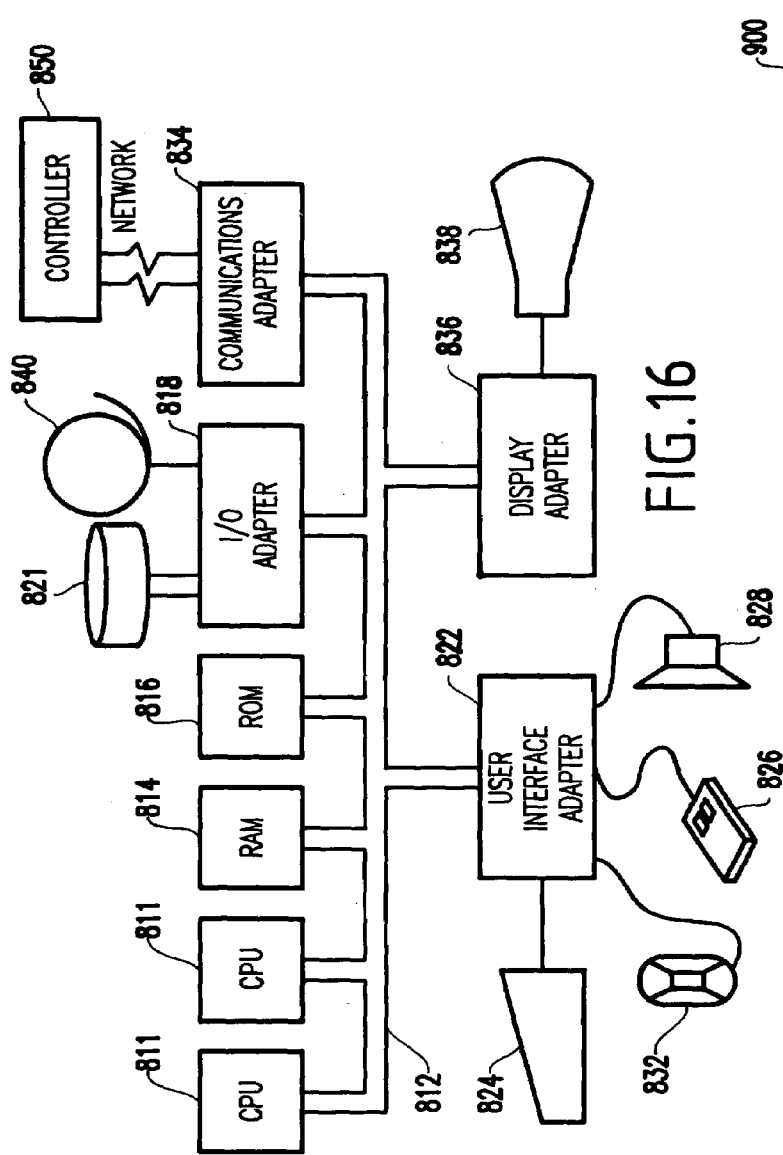
FIG. 16 is a schematic block diagram of an exemplary information handling/computer system for use with the present invention.

For example, as shown in FIG. 16, a typical hardware configuration 800 of an information handling/computer system is provided. The system preferably has at least one processor or central processing unit (CPU) 811. The CPUs 811 are interconnected via a system bus 812 to a random access memory (RAM) 814, read-only memory (ROM) 816, input/output (I/O) adaptor 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), communication adapter 834 for connecting an information handling system to the Internet, Intranet, a data processing network, etc., and a display adapter 836 (for connecting the bus 812 to a display device 838). Additionally, an external controller 850 can be coupled to the system through the network and communications adapter 834.

Further, while the present invention has been described primarily in terms of software or software/hardware configuration, the same or similar functions could be implemented in a dedicated hardware arrangement.

Such a method as described above may be implemented, for example, by operating a computer, as embodied by a digital data processing apparatus, to execute a sequence of machine-readable instructions. These instructions may reside in various types of signal-bearing media.

Thus, an aspect of the present invention may be directed to a programmed product, including signal-bearing media tangibly embodying a program of machine-readable instructions executable by a digital data processor to perform a method of searching for documents.

Figure 17:
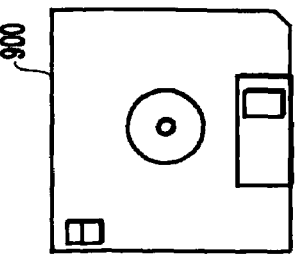
FIG. 17 illustrates a medium for storing a program for implementing the method according to the present invention.

This signal-bearing media may include, for example, a random access memory (RAM) such as, for example, a fast-access storage contained within the computer. Alternatively, the instructions may be contained in another signal-bearing media, such as a magnetic storage diskette 900 shown exemplarily in FIG. 17, directly or indirectly accessible by the computer.

Whether contained in the diskette, the computer, or elsewhere, the instructions may be stored on a variety of machine-readable data storage media, such as DASD storage (e.g. a conventional "hard drive" or a RAID array), magnetic tape, electronic read-only memory (e.g. ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a suitable language.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A method for using watermarks to distribute and authenticate human perceptible source data sets, comprising;
   digitizing and segmenting a human perceptible source data set into a plurality of non-overlapping digitized segments and a corresponding plurality of overlapping digitized segments, wherein:
       each non-overlapping segment is embedded within its corresponding overlapping segment in the same manner, and
       said digitizing comprises a digital representation of said human perceptible source data set, and digital representation including digital elements, each said element being divided into high order bits and low order bits, said high order bits being sufficient to preserve the human perceptibility of said source data set;
   creating a watermarked version of said source data set, wherein said creating a watermarked version of said source data set comprises, for each of said plurality of corresponding segments:
       adding privacy control to said high order bits of said overlapping segment, resulting in a data set including encrypted high order bits;
       applying a watermarked algorithm to said data set including encrypted high order bits, said algorithm resulting in a data set reduced in size;
       mapping said reduced data set onto the low order bits of said non-overlapping segment, thereby replacing said low order bits, said reduction in size being sufficient such that said mapping results in spare low order bits being left over, some of said spare low order bits being used to indicate watermark attributes, wherein said mapping modifies a portion of said low order bits, said portion being adjustable downward to achieve higher fidelity and adjustable upward to achieve higher security;
   distributing said watermarked data set;
   applying a privacy release algorithm to said watermarked data set; and
   authenticating said watermarked data set, wherein said authenticating is performed on a cropped portion of said watermarked data set, said watermark attributes being used to align said over-lapping segments.

2. A method for using watermarks to distribute and authenticate human perceptible source data sets, comprising:
   digitizing and segmenting a human perceptible source data set into a plurality of non-overlapping digitized segments and a corresponding plurality of overlapping digitized segments, wherein:
       each non-overlapping segment is embedded within its corresponding overlapping segment in the same manner, and
       said digitizing comprises a digital representation of said human perceptible source data set, said digital representation including digital elements, each said element being divided into high order bits and low order bits, said high order bits being sufficient to preserve the human perceptibility of said source data set;
   creating a watermarked version of said source data set wherein said creating a watermarked version of said source data set comprises, for each of said plurality of corresponding segments:
       adding privacy control to said high order bits of said overlapping segment, resulting in a data set including encrypted high order bits;

applying a watermarking algorithm to said data set including encrypted high order bits, said algorithm resulting in a data set reduced in size;

mapping said reduced data set onto the low order bits of said non-overlapping segment, thereby replacing said low order bits, said reduction in size being sufficient such that said mapping results in spare low order bits being left over, some of said spare low order bits being used to indicate watermark attributes, wherein said mapping modifies a portion of said low order bits, said portion being adjustable downward to achieve higher fidelity and adjustable upward to achieve higher security;

distributing said watermarked data set;

applying a privacy release algorithm to said watermarked data set; and authenticating said watermarked data set, wherein said authenticating is performed on a cropped portion of said watermarked data set, and wherein a small fixed synchronization pattern is embedded in said spare low order its for use in aligning said overlapping segments.

3. An apparatus for using watermarks to distribute and authenticate human perceptible source data sets, comprising:

means for digitizing and segmenting a human perceptible source data set into a plurality of non-overlapping digitized segments and a corresponding plurality of overlapping digitized segments, wherein:

each non-overlapping segment is embedded within its corresponding overlapping segment in the same manner, and said digitizing means comprises a digital representation of said human perceptible source data set, said digital representation including digital elements, each said element being divided into high order bits and low order bits, said high order bits being sufficient to preserve the human perceptibility of source data set;

means for creating a watermarked version of said source data set, wherein said means for creating a watermarked version of said source data set comprises, for each of said plurality of corresponding segments:

means for adding privacy control to said high order bits of said overlapping segment, resulting in a data set including encrypted high order bits;

means for applying a watermarking algorithm to said data set including encrypted high order bits, said algorithm resulting in a data set reduced in size; and means for mapping said reduced data set onto the low order bits of said non-overlapping segment, thereby replacing said low order bits, said reduction in size being sufficient such that said mapping results in spare low order bits being left over, some of said spare low order bits being used to indicate watermark attributes, wherein said mapping means modifies a portion of said low order bits, said portion being adjustable downward to achieve higher fidelity and adjustable upward to achieve higher security, means for distributing said watermarked data set;

means for applying a privacy release algorithm to said watermarked data set; and means for authenticating said watermarked data set, wherein said authenticating means operates on a cropped portion of said watermarked data set, said watermark attributes being used to align said overlapping segments.

4. An apparatus for using watermarks to distribute and authenticate human perceptible source data sets, comprising;

means for digitizing and segmenting a human perceptible source data set into a plurality of non-overlapping digitized segments and a corresponding plurality of overlapping digitized segments, wherein:

each non-overlapping segment is embedded within its corresponding overlapping segment in the same manner, and said digitizing means comprises a digital representation of said human perceptible source data set, said digital representation including digital elements, each said element being divided into high order bits and low order bits said high order bits being sufficient to preserve the human perceptibility of said source data set;

means for creating a watermarked version of said source data set, wherein said means for creating a watermarked version of said source data set comprises, for each of said plurality of corresponding segments:

means for adding privacy control to said high order bits of said overlapping segment, resulting in a data set including encrypted high order bits;

means for applying a watermarking algorithm to said data set including encrypted high order bits, said algorithm resulting in a data set reduced in size; and means for mapping said reduced data set onto the low order bits of said non-overlapping segment, thereby replacing said low order bits, said reduction in size being sufficient such that said mapping results in spare low order bits being left over, some of said spare low order bits being used to indicate watermark attributes, wherein said mapping means modifies a portion of said low order bits, said portion being adjustable downward to achieve higher fidelity and adjustable upward to achieve higher security, means for distributing said watermarked data set;

means for applying a privacy release algorithm to said watermarked data set; and means for authenticating said watermarked data set, wherein said authenticating means operates on a cropped portion of said watermarked data set, and wherein a small fixed synchronization pattern is embedded in said spare low order bits for use in aligning said over-lapping segments.

* * * * *